US 6,654,578 B2

(12) United States Patent
Suzuki et al.

(10) Patent No.: US 6,654,578 B2
(45) Date of Patent: Nov. 25, 2003

(54) IMAGE FORMING APPARATUS TO WHICH A PROCESS CARTRIDGE HAVING A PART CONNECTING MEMBER IS DETACHABLY MOUNTABLE, PROCESS CARTRIDGE HAVING A PART CONNECTING MEMBER, AND PART CONNECTING MEMBER

(75) Inventors: Akira Suzuki, Kanagawa (JP); Kenshiro Abe, Ibaraki (JP); Tadayuki Tsuda, Shizuoka (JP); Kouichi Hiratsuka, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/946,487

(22) Filed: Sep. 6, 2001

(65) Prior Publication Data

US 2002/0037179 A1 Mar. 28, 2002

(30) Foreign Application Priority Data

Sep. 12, 2000 (JP) ........................................ 2000-276503

(51) Int. Cl.⁷ .................... G03G 15/00; G03G 21/16; B29C 31/06
(52) U.S. Cl. ........................ 399/111; 264/263
(58) Field of Search ..................... 399/111; 264/261, 264/262, 263

(56) References Cited

U.S. PATENT DOCUMENTS

| | | | | |
|---|---|---|---|---|
| 3,264,394 A | | 8/1966 | Gohl | .......................... 264/263 |
| 4,261,947 A | * | 4/1981 | Ogi | ............................ 264/263 |
| 4,588,467 A | | 5/1986 | Tani et al. | ................... 156/294 |
| 5,792,407 A | * | 8/1998 | Berzack | ................... 264/263 X |
| 6,246,853 B1 | * | 6/2001 | Suzuki et al. | ........... 399/111 X |
| 6,365,083 B1 | * | 4/2002 | Nishida | ................... 264/261 X |
| 6,415,121 B1 | * | 7/2002 | Suzuki et al. | ................ 399/111 |

FOREIGN PATENT DOCUMENTS

| | | | |
|---|---|---|---|
| EP | 0 552 510 | | 7/1993 |
| JP | 63-057222 | * | 3/1988 |
| JP | 2-38377 | | 8/1990 |
| JP | 11-013980 | * | 1/1999 |

* cited by examiner

*Primary Examiner*—Fred L. Braun
(74) *Attorney, Agent, or Firm*—Fitzpatrick, Cella, Harper & Scinto

(57) ABSTRACT

A synthetic resin part connecting member connects at least two injection molded pieces that can be used as frames for a process cartridge detachably mountable on an image forming apparatus. The molded pieces are set in dies different from the dies used for forming the molded pieces, and a molten resin is injected into a gap formed between opposed surfaces of the molded pieces. An injection channel for the molten resin up to the gap is formed in one of the molded pieces. A rib for stopping resin is provided in the injection channel to stop the flow of the molten resin injected into the injection channel.

31 Claims, 16 Drawing Sheets

IMAGE FORMING APPARATUS TO WHICH A PROCESS CARTRIDGE HAVING A PART CONNECTING MEMBER IS DETACHABLY MOUNTABLE, PROCESS CARTRIDGE HAVING A PART CONNECTING MEMBER, AND PART CONNECTING MEMBER

BACKGROUND OF THE INVENTION

1. Field of the Invention

The present invention relates to the configurations of an electrophotographic image forming apparatus adopting an electrophotographic image forming process such as a laser printer and an electrophotographic copying machine, and further relates to a process cartridge and the configuration of a part connecting member that is made from a synthetic resin and is for the use of the electrophotographic image forming apparatus and the process cartridge.

Hereupon, the electrophotographic image forming apparatus is a device for forming an image on a recording medium by adopting an electrophotographic image forming process. Examples of the electrophotographic image forming apparatus include, for example, an electrophotographic copying machine, an electrophotographic printer (such as a laser printer, an LED printer and the like), a facsimile machine, a word processor and the like.

Incidentally, the process cartridge is a device that is made by the integration of charging means, developing means or cleaning means, and an electrophotographic photosensitive member as a cartridge which is detachably mountable to the main body of an electrophotographic image forming apparatus. And also, the process cartridge is a device that is made by the integration of at least one of charging means, developing means and cleaning means, and an electrophotographic photosensitive member as a cartridge which is detachably mountable to the main body of an electrophotographic image forming apparatus. Furthermore, a device that is made by the integration of at least developing means and an electrophotographic photosensitive member as a cartridge which is detachably mountable to the main body of an electrophotographic image forming apparatus is also called as the process cartridge.

2. Description of the Related Arts

At first the outline of a conventional color laser printer is described on the basis of the cross section of FIG. 20.

In FIG. 20, reference numeral 105 designates a rotary developing apparatus including developing devices 105M, 105C, 105Y and 105B equipped with a magenta toner, a cyan toner, a yellow toner and a black toner, respectively. These four color developing devices 105M, 105C, 105Y and 105B are disposed rotatably around a shaft 105e. Each center of the developing devices 105M, 105C, 105Y and 105B rotates in connection with a rotating gear disposed on the outer periphery of a revolving gear to keep their postures constant. Then, at the time of the formation of an image, one of the developing devices 105M, 105C, 105Y and 105B corresponding to a latent image stops at a position opposed to an image bearing member 104, and then a developing roller 105b is positioned to be opposed to the surface of the image bearing member 104 with a narrow gap between them.

Then, at the time of developing, by the application of a bias voltage on the developing roller 105b and by the rotation driving thereof, the developing roller 105b develops the latent image on the image bearing member 104 to visualize the latent image as a toner image.

Now, a supply roller 105a rubs against a developing roller 105b, both being disposed in each of the developing devices 105M, 105C, 105Y and 105B. Each supply roller 105a scrapes off the developer that did not contribute to the last development, and fresh developer is always supplied to the developing roller 105b. A toner container for supplying developer to the developing roller 105b is integrally provided to each of the developing devices 105M, 105C, 105Y and 105B. Hereupon, a conventional toner container is described.

FIG. 1B is a principal section showing a conventional toner container 40. A toner container 42 and a lid 41 of the toner container are joined by the flowing of the same resin into gaps 142a and 142b formed between molded pieces in a die in conformity with the die slide injection molding method using the same die at the molding process and the forming process, which method is disclosed in, for example, Japanese Examined Patent Publication No. 2-38377.

Flanges 143a, 143b, 143c and 143d are formed on the toner container 42 and the lid 41 at the gaps 142a and 142b between the molded pieces. Moreover, portions 144a, 144b, 144c and 144d recessed or projected in a die cutting direction are formed on the back surfaces of the flanges 143a, 143b, 143c and 143d intermittently or continuously along the lengthwise direction of the die. The portions 144a, 144b, 144c and 144d are engaged with prescribed portions in the die.

Furthermore, an entrance through which a material for joining is injected into the gaps between the molded pieces, or a gate 72 in the terminology of molding techniques, is formed on substantially an extension line of the gap 142a, which is formed between frames, in a horizontal direction as shown in FIG. 7. Molten resin perpendicularly flows into the gap 142a between the molded pieces from the horizontal direction through the gate 72 as indicated by an arrow 70.

However, in the conventional toner container, because the position of the entrance for injecting the material for joining into the gap between the molded pieces, which entrance is called the gate in the terminology of molding techniques, should adjoin the gap, the direction of the injection of the resin is inevitably determined. Consequently, restriction on the designing of the die is tight.

The present invention is one that further improves the related art for resolving the aforesaid problem.

SUMMARY OF THE INVENTION

One object of the invention is to provide a part connecting member that realizes the improvement of molding workability, a process cartridge using the part connecting member, and an electrophotographic image forming apparatus that can detachably mount the process cartridge.

Another object of the invention is to provide a part connecting member in which the direction of the injection of resin can arbitrarily be determined, a process cartridge using the part connecting member, and an electrophotographic image forming apparatus that can detachably mount the process cartridge.

A further object of the invention is to provide a part connecting member that can improve the degree of freedom of the designing of dies to be used for molding, a process cartridge using the part connecting member, and an electrophotographic image forming apparatus that can detachably mount the process cartridge.

A still further object of the invention is to provide a part connecting member that realizes the improvement of the degree of freedom of the designing of a product, a process cartridge using the part connecting member, and an electrophotographic image forming apparatus that can detachably mount the process cartridge.

A still further object of the invention is to provide the configuration of a hollow body that is made from a resin and that has restriction on the designing of a product and the manufacturing of the product as little as possible for obtaining a product of high quality in a configuration formed by the following processes. That is, for example, at least two molded pieces obtained by the injection molding of plastic are provisionally connected by being adjacently arranged or abut against each other. The provisionally connected bodies are set in a die different from the dies used for the formation of each molded piece. Then, in a state such that each molded piece and the die are positioned, the molded pieces are joined by the injection of a molten resin material for joining into a gap formed between the opposed surfaces of the molded pieces that are adjacently arranged or abut against each other.

A still further object of the invention is to provide a part connecting member, and a process cartridge and an electrophotographic image forming apparatus, both using the part connecting member made from a synthetic resin. One of the molded parts forming a gap between opposed surfaces that are adjacently arranged or abut against each other forms an injection channel of a molten resin up to a connection portion in configuration formed by the following processes. That is, at least two molded pieces obtained by the injection molding of plastic are provisionally connected by being adjacently arranged or abut against each other. The provisionally connected body is set in a die different from the dies used for the formation of each molded piece. Then, in a state such that each molded piece and the die are positioned, the molded pieces are joined by the injection of the molten resin into the gap formed between the opposed surfaces of the molded pieces that are adjacently arranged or abut against each other.

A still further object of the invention is to provide a part connecting member, and a process cartridge and an electrophotographic image forming apparatus, both using the part connecting member made from a synthetic resin, and the part connecting member comprises first to fourth frames being molded pieces. The third and the fourth frames form an injection channel of a molten resin up to a connection portion in the following configuration. That is, the part connecting member is configured by provisionally connecting side faces of the first frame and the second frame on one end side and the other end side of the frames in a state of being adjacently arranged or abutted against each other with the third frame and the fourth frame, first. Then, the provisionally connected member is set in a die different from dies used for formation of each of the molded pieces. Moreover, a molten resin is injected in a gap formed between opposed surfaces of the molded pieces that are adjacently arranged or abutted against each other to connect the molded pieces in a state such that each of the molded pieces and the die are positioned a gap.

A still further object of the invention is to provide a part connecting member, and a process cartridge and an electrophotographic image forming apparatus, both using the part connecting member made from a synthetic resin. The part connecting member is configured in conformity with the following processes. That is, at least two molded pieces obtained by the injection molding of plastic are provisionally connected by being adjacently arranged or abutted against each other. The provisionally connected member is set in a die different from the dies used for the formation of each molded piece. Then, in a state such that each molded piece and the die are positioned, the molded pieces are joined by the injection of a molten resin material for joining into a gap formed between the opposed surfaces of the molded pieces that are adjacently arranged or abutted against each other. A portion of the opposed surfaces to be connected with the molten resin when the molten resin flows into the gap is not all of the peripheries of the gap.

A still further object of the invention is to provide a part connecting member, and a process cartridge and an electrophotographic image forming apparatus, both using the part connecting member made from a synthetic resin, and the part connecting member comprises first to fourth frames several of which comprise a molded piece. The third frame and the fourth frame provisionally connect the side faces of the first and the second frames on one end side and the other end side of the frames in a state of being adjacently arranged or abutted against each other. Then, the provisionally connected member is set in a die different from dies used for the formation of each of the molded pieces. Moreover, a molten resin is injected to connect the molded pieces into a gap formed between opposed surfaces of the molded pieces that are adjacently arranged or abutted against each other in a state such that each of the molded pieces and the die are positioned. A portion of the opposed surfaces to be connected with the molten resin when the molten resin flows into the gap is not all of the peripheries of the gap.

These and other objects, features and advantages of the present invention will become more apparent upon consideration of the following description of the preferred embodiments of the present invention taken in conjunction with the accompanying drawings.

DESCRIPTION OF THE PREFERRED EMBODIMENTS

The preferred embodiments of the present invention are described in the following on the basis of the attached drawings.

An embodiment of the present invention in which four container parts are joined is described on the basis of FIG. 16 to FIG. 19. The joining of the four container parts involves the fixation of toner container (second frame) and a cleaning container (first frame) with side covers (third and fourth frames) on a front side (F side) and a rear side® side). The lengthwise direction of the embodiment is a direction parallel to a direction that is perpendicular to the conveying direction of a recording medium and is parallel to the surface of the recording medium.

(Descriptions of Process Cartridge and Main Body of Apparatus)

Figure 16:
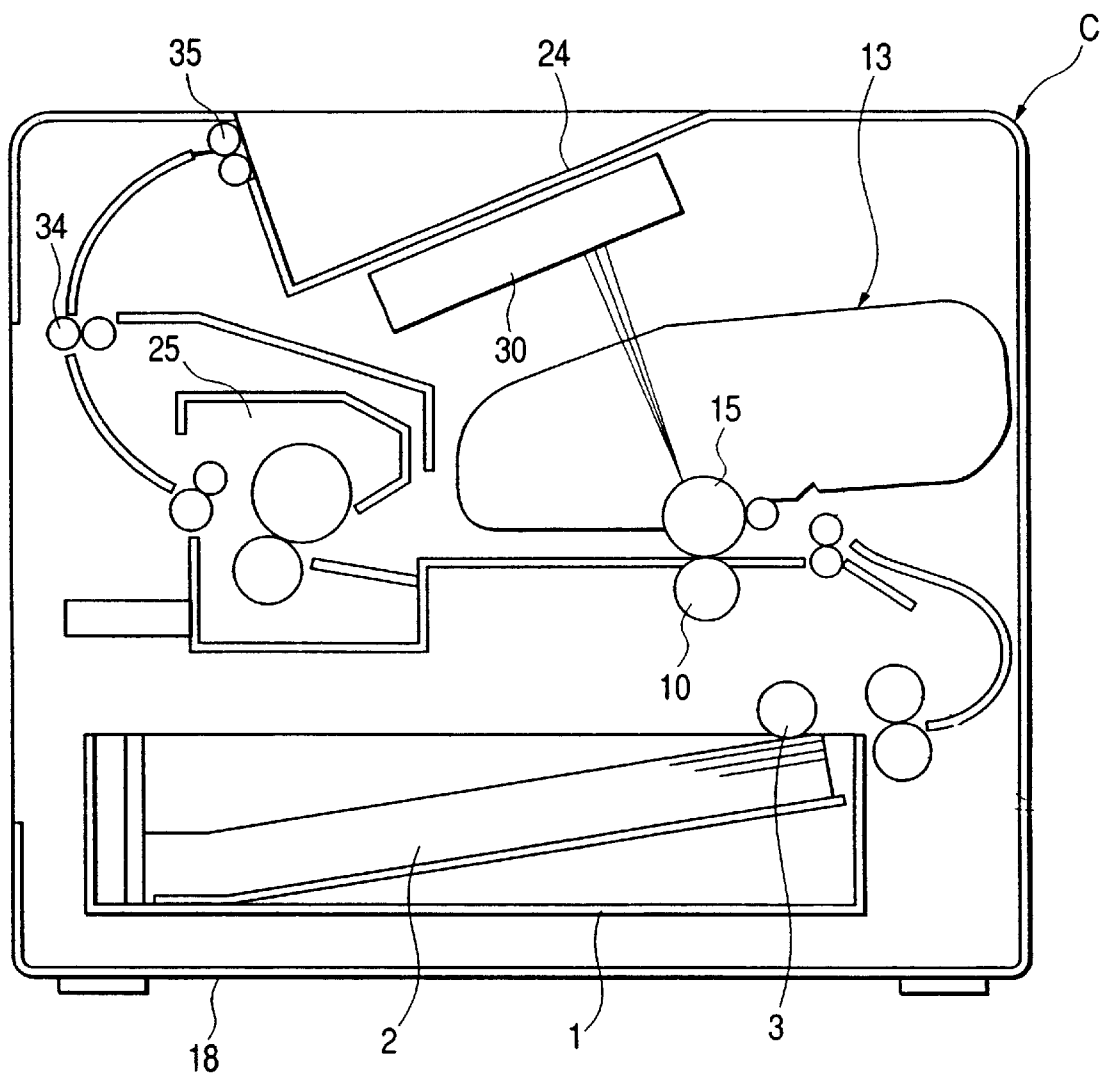
FIG. 16 is a longitudinal section of a printer.
Figure 17:
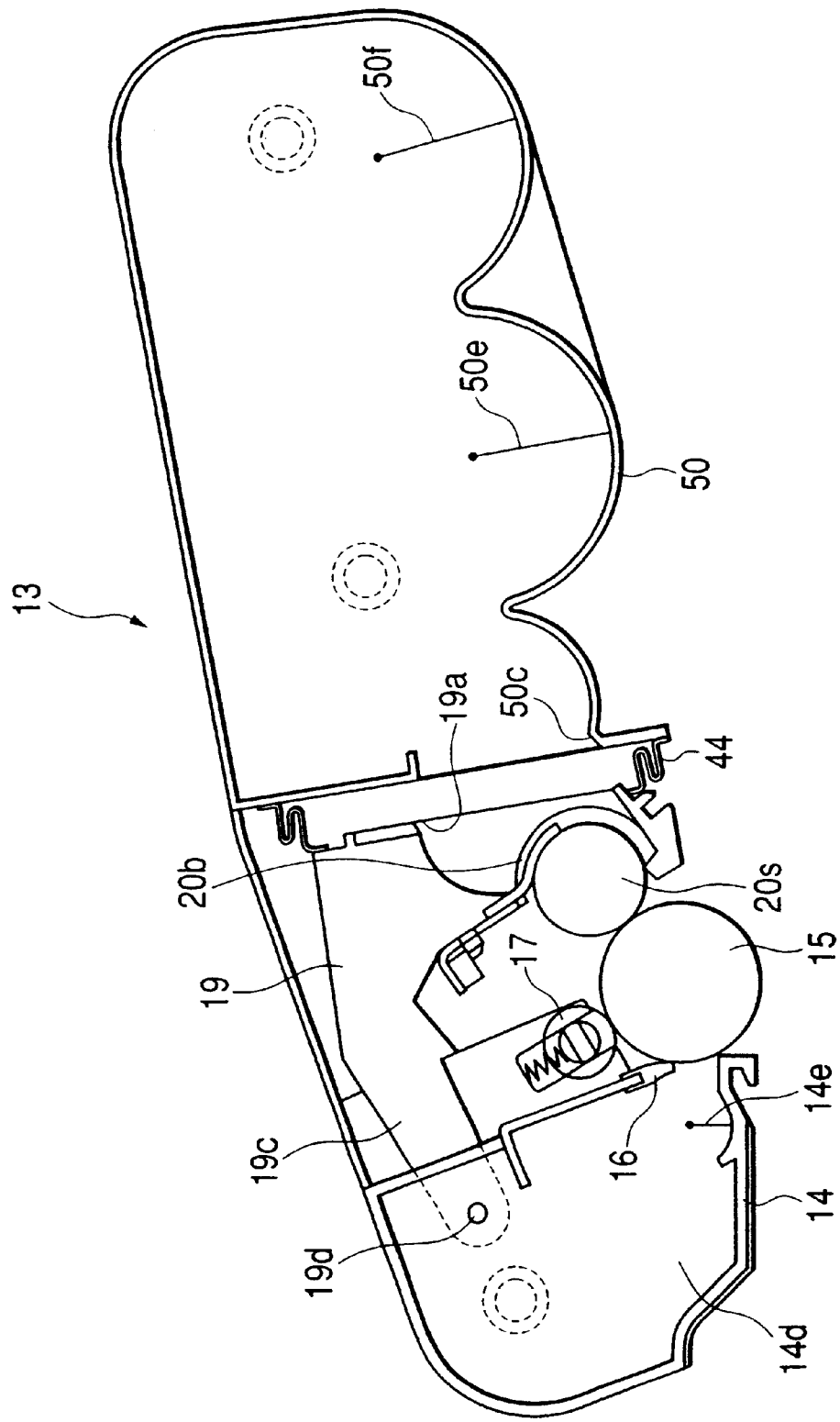
FIG. 17 is a longitudinal section of a process cartridge.

FIG. 17 shows the principal section of a process cartridge according to the present invention, and FIG. 16 shows the principal section of an electrophotographic image forming apparatus according to the invention. The process cartridge is equipped with an electrophotographic photosensitive member and process means for acting on the electrophotographic photosensitive member. Now, as the process means, there are, for example, charging means for charging the surface of the electrophotographic photosensitive member, a developing device for forming a toner image on the electrophotographic photosensitive member, and cleaning means for removing the residual toner on the surface of the electrophotographic photosensitive member.

The process cartridge 13 of the present embodiment is configured, as shown in FIG. 17, by the disposition of a charging roller as the charging means 17 around a photosensitive drum 15 as the electrophotographic photosensitive member that is an image bearing member, a developing roller 20s and a developing blade 20b as the developing means, and the cleaning container 14 with a cleaning blade 16 as the cleaning means, and by the integral covering of them with a housing. The process cartridge 13 is configured to be detachably mountable to the main body 18 of the image forming apparatus (hereinafter referred to as apparatus main body).

The process cartridge 13 is mounted on an electrophotographic image forming apparatus C that is shown in FIG. 16 to be used for the formation of an image. At the formation of an image, a transferring material 2 is conveyed with a feed roller 3 from a feed cassette 1 mounted at the lower part of the apparatus, and then a latent image is formed by the selective exposure to the photosensitive drum 15 from a scanner 30 in synchronism with the conveyance of the transferring material 2. After that, triboelectification charges are induced on the toner contained in a toner container 50 by the developing blade 20b, and the toner is borne on the surface of the developing roller 20s as a thin layer. Then, a bias voltage for development is impressed on the developing roller 20s to supply the toner on the photosensitive drum 15 corresponding to the latent image. A toner image is transferred to the transferring material 2, which is a recording medium to be transported, by the imposed bias voltage on a transfer roller 10. The transferring material 2 is transported to a fixing device 25 to fix the image. And then, the transferring material 2 is delivered to a delivery portion 4 disposed at the upper part of the apparatus with delivery rollers 34 and 35. On the other and, after the transferring, residual toner on the photosensitive drum 15 is removed with the cleaning blade 16, and the removed toner is transported to a removed toner reservoir 14d with a carrying member 14e of the removed toner.

(Frame Configuration of Process Cartridge)

Figure 18:
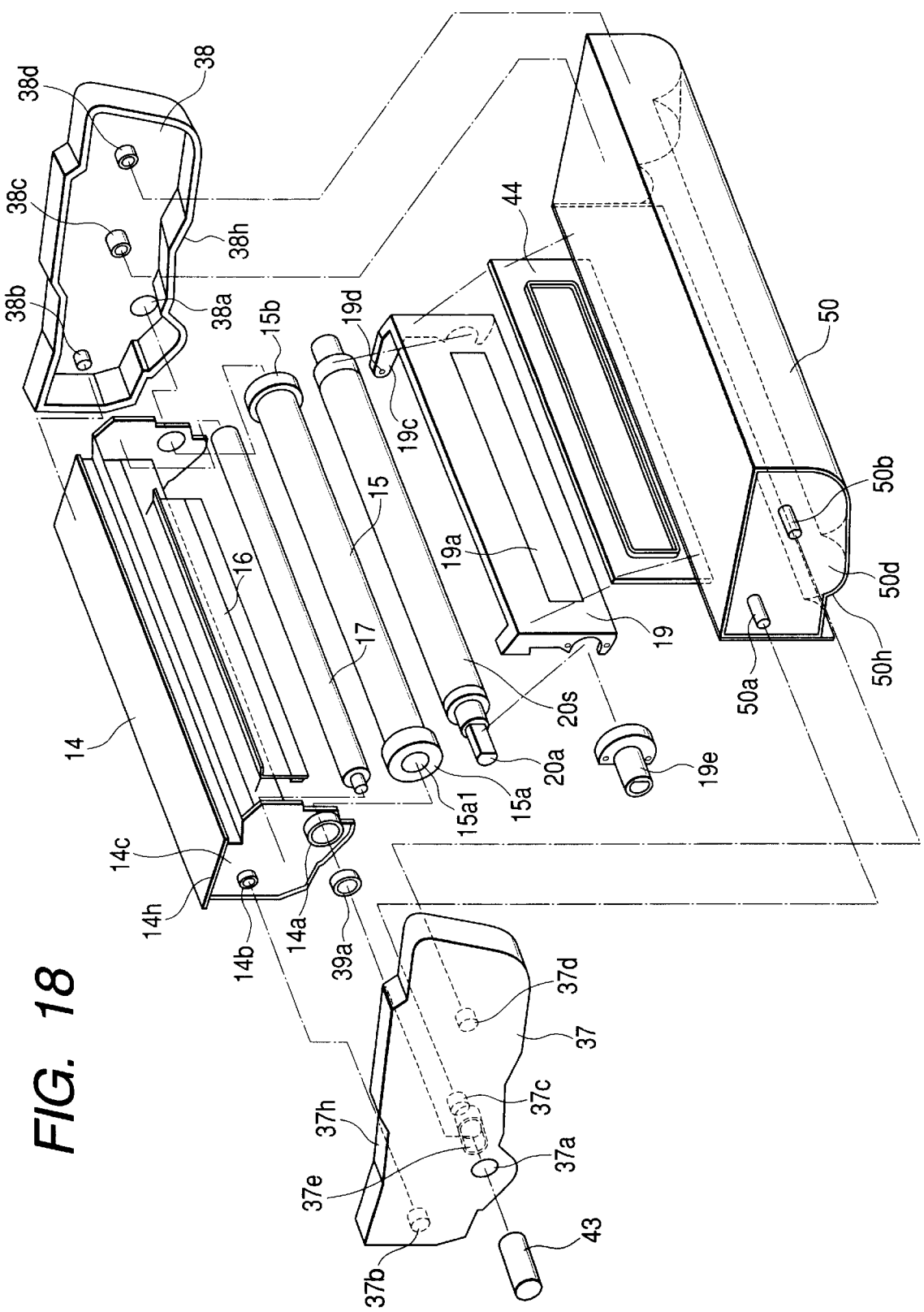
FIG. 18 is a disassembled perspective view of the process cartridge.
Figure 19:
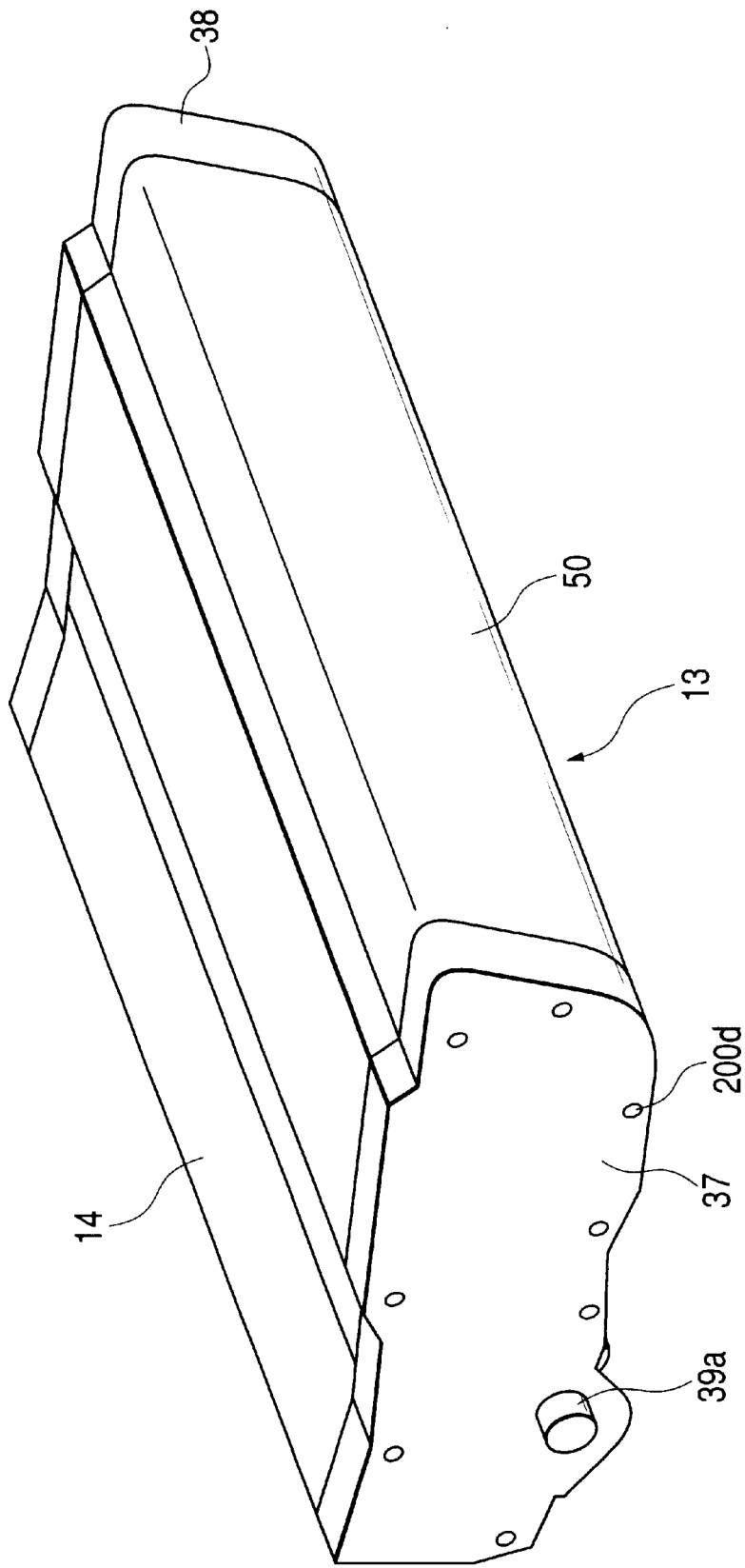
FIG. 19 is a perspective view of the process cartridge.
Figure 20:
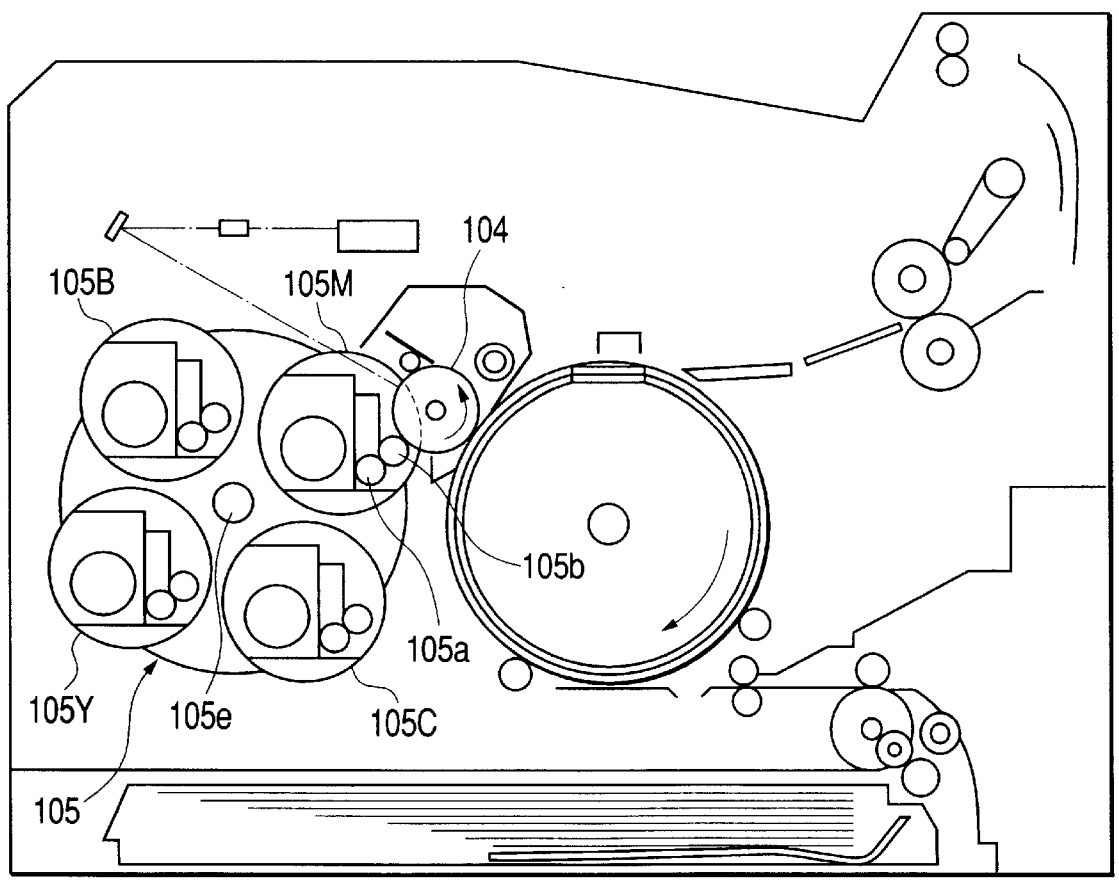
FIG. 20 is a longitudinal section of a conventional electrophotographic image forming apparatus.

FIGS. 18 and 19 are perspective vies showing the frame configuration of the process cartridge. FIG. 18 shows a state before the assembling of these frames, and FIG. 19 shows a state after the assembling of these frames. The process cartridge 13 is composed of three frames. The three frames are the cleaning container 14 supporting the photosensitive drum 15, the charging roller as the charging means 17 and the cleaning blade 16 integrally, a developing frame 19 supporting the developing roller 20s and the developing blade (not shown in FIG. 18. See reference numeral 20b in FIG. 17.) integrally, and the toner container 50 containing toner. Furthermore, for the integral support of these three frames, side covers 37 and 38 fix both the sides of the cleaning container 14 and the toner container 50, severally, and the developing frame 19 is supported by the cleaning container 14 to consist of the process cartridge 13.

The cleaning blade 16 is fixed to the cleaning container 14 with small screws or the like, and the charging means 17 supports core metal portions at ends with a bearing member (not shown) rotatably. Moreover, the cleaning container 14 is removably provided with the carrying member 14e for carrying the removed toner that was removed with the cleaning blade 16 to the removed toner reservoir 14d as shown in FIG. 17. Moreover, flange portions 15a and 15b on both the ends of the photosensitive drum 15 are supported by the cleaning container 14 with two bearing members (only the bearing member 39a is shown in FIG. 18) fixed the cleaning container 14, respectively. The toner container 50 contains toner together with agitating members 50e and 50f (see FIG. 17) for conveying and agitating the toner in the toner container 50.

The side covers 37 and 38 have such a size as cover the principal section of the process cartridge 13 (a perpendicular surface along the transporting direction of recording media), and are disposed at both the ends of the process cartridge 13 in the lengthwise direction thereof. The side covers 37 and 38 cover the cleaning container 14 and the toner container 50 to be fixed on the cleaning container 14 and the toner container 50 from their both sides for supporting the cleaning container 14 and the toner container 50 integrally. Respective hole portions 37a and 38a of the side covers 37 and 38 are positioned on the same axis as the center of the photosensitive drum 15 in the cleaning container 14. On the side cover 37 side shown in the figures, the bearing member 39a is force-fitted into a hole portion 14a of the cleaning container 14. A shaft member 43 is fitted into the hole portion 37a of the side cover 37, the bearing member 39a, and the center hole 15a1 of the flange 15a to support one end of the photosensitive drum 15 rotatably. Because the positioning of the side cover 37 is performed with the bearing member 39a at this time, the position of the side cover 37 to the photosensitive drum 15 can precisely be determined. Moreover, a positioning portion 37b that is formed at a position as far as possible from the photosensitive drum 15 is fitted into a positioning portion 14b formed on the side face 14c of the cleaning container 14, and then the position of the rotation direction is determined around the center of the photosensitive drum 15 as the center thereof.

Furthermore, cylindrical positioning portions 50a and 50b are formed on one end surface 50d in the lengthwise direction of the toner container projectingly in the lengthwise direction, and the positioning portions 50a and 50b are fitted into positioning portions 37c and 37d that are holes disposed on the side cover 37 to perform the positioning of the toner container 50. The side cover 38 on the other side similarly positions the toner container 50 and the cleaning container 14 (reference characters 38a, 38b, 38c and 38d). The developing frame 19 determines its position in a method that will be described later. Moreover, the two bearing members fixed on cleaning container 14, one of which is bearing member 39a, are also used for the positioning of the process cartridge 13 to the apparatus main body 18.

Opening portions 50c (see FIG. 17) and 19a are formed in the toner container 50 and the developing frame 19, respectively, for supplying toner to the developing roller 20s from the toner container 50. The developing frame 19 and the toner container 50 are connected to each other with a flexible seal member 44 as a sealing member for the connection of the opening portions 19a and 50c to each other. Because the toner container 50 is positioned with respect to the side covers 37 and 38 and the developing frame 19 is positioned with respect to the cleaning container 14, and further because there are some dimension errors between the developing frame 19 and the toner container 50, it is necessary to arrange the developing frame 19 and the toner container 50 with a little gap. Then, the process cartridge 13 is positioned for the mounting thereof on the cartridge mounting portion of the apparatus main body 18 on the cleaning container 14 side supporting the photosensitive drum 15. Because the weight difference of the toner container 50, between a case where the toner container 50 contains a great deal of toner and a case where the toner container 50 is vacant, is large, there is the possibility that the toner container 50 or both of or either of the side covers 37 and 38 is distorted. Accordingly, a flexible material is used for the seal member 44.

(Configuration of Developing Frame)

The configuration of the developing frame 19 is described by reference to FIGS. 17 and 18.

The developing frame 19 is provided with the developing roller 20s involving a magnet roller 20a (see FIG. 18) as a developer bearing member and the developing blade 20b. Both ends of the developing roller 20s are rotatably supported by the developing frame 19. Moreover, the developing roller 20s is configured such that the electric power supply to the developing roller 2 is performed through an electric contact point formed in the developing roller 20s.

The developing frame 19 is supported by the cleaning container 14 in such a way that the developing frame 19 can swing around a hanging hole 19d at the end of an arm portion 19c formed on the driving side, of the developing roller 20s, which is one of the ends of the developing roller 20s in the lengthwise direction, in order that the center of the developing roller 20s moves toward the center of the photosensitive drum 15. That is, the developing frame 19 including the developing roller 20s is disposed on the driving side of the cleaning container 14 in a state such that the developing roller 20s can swing around a pin (not shown) that is fitted to the hanging hole 19d. And the cleaning container 14 and the toner container 50 are fixed in a state such that they can relatively move. Consequently, the developing frame 19 can move relative to the toner container 50. Then, one end side of the developing roller 20s is energized to one end side of the photosensitive drum 15 with a helical extension spring hung between spring pegs (not shown) formed on the cleaning container 14 and the developing frame 19, severally.

Furthermore, a projecting member 19e is fixed on the central axis of the developing roller 20s on the non-driving side of the developing frame 19, and the projecting member 19e is configured to be pressured to the center direction of the photosensitive drum 15.

The projecting member 19e is inserted in a groove 37e (an elongated hole having a shape of a straight line in a radial direction of the photosensitive drum 15 in the present embodiment) formed on the side cover 37, and the projecting member 19e is configured such that the projecting member 19e can move in the center direction of the photosensitive drum 15. That is, the projecting member 19e is a moving member moving on the one end of the developing roller 20s. Moreover, an unillustrated helical compression spring that is an energizing member is provided in order to pressure the projecting member 19e with a slide piece, which is put between the helical compression spring and the projecting member 19e and is movable along the groove 37e.

The aforesaid side covers 37 and 38 have a shape of a container, and the sides of the side covers 37 and 38 that are opposed to the end surfaces 50d of the toner container 50 and the side faces 14c of the cleaning container 14 are opened. Edges 37h and 38h of the side covers 37 and 38 are connected with edges 50h and 14h of the end surfaces 50d of the toner container 50 and the side faces 14c of the cleaning container 14. For the connection, any one of Embodiment 1 to Embodiment 9 is applied.

Figure 4:
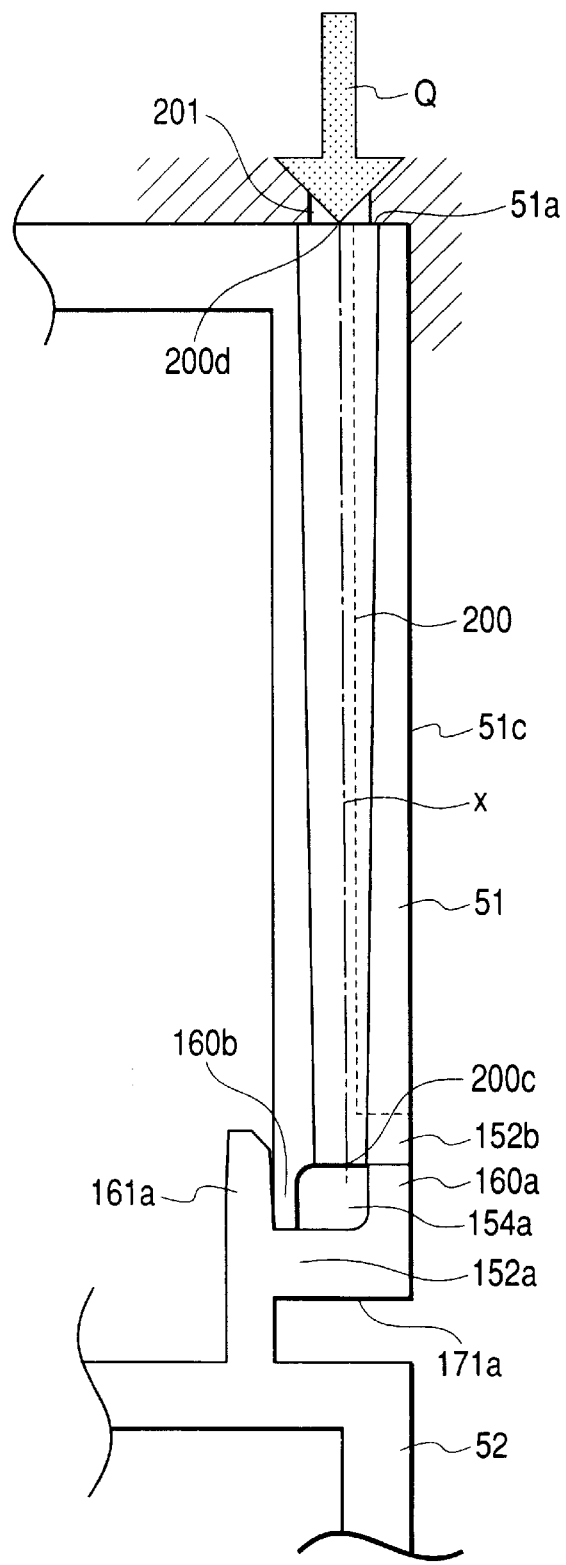
FIG. 4 is a cross section taken along a IV—IV line in FIG. 3.
Figure 6:
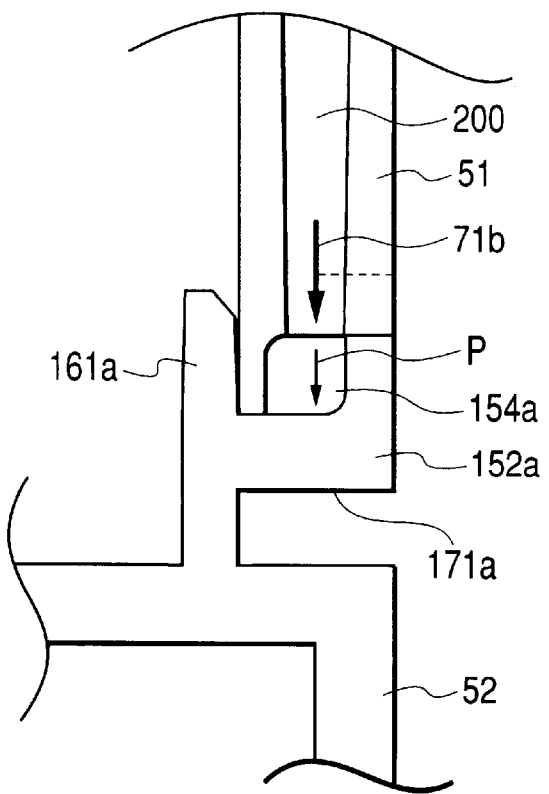
FIG. 6 is a partially enlarged view of FIG. 4.
Figure 7:
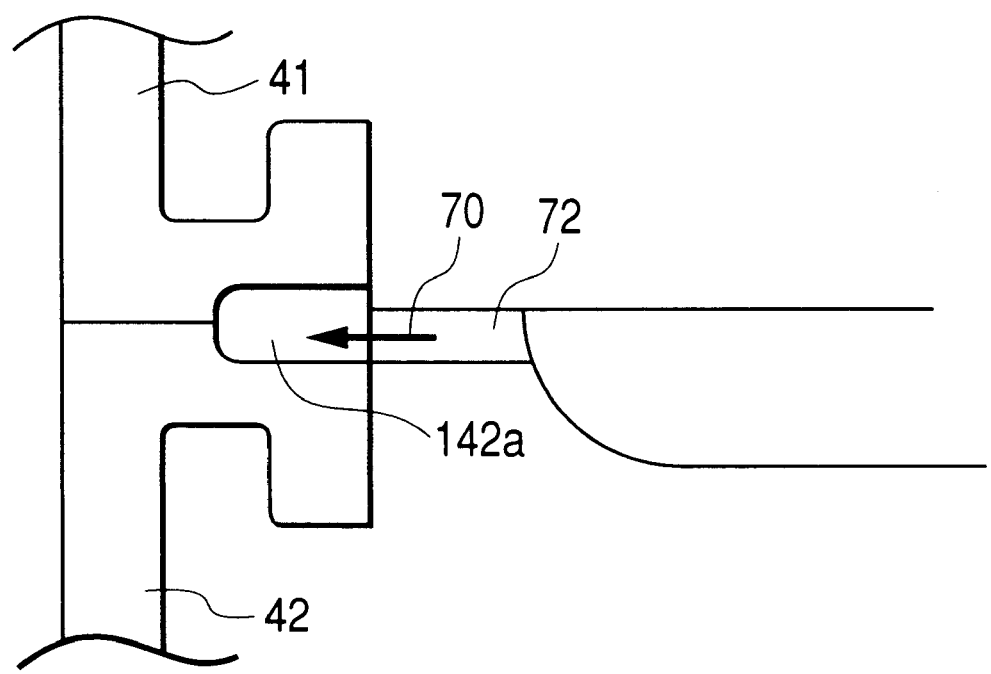
FIG. 7 is a longitudinal section showing a runner and a gate of a reference example.

FIG. 4 and FIG. 6 show an embodiment of the present invention, and FIG. 7 shows a reference example for illustrating the embodiment of the invention.

Next, the embodiments of the invention are shown. Incidentally, the numbers of the embodiments are not linked to the numbers of claims.

(Embodiment 1)

Figure 1B:
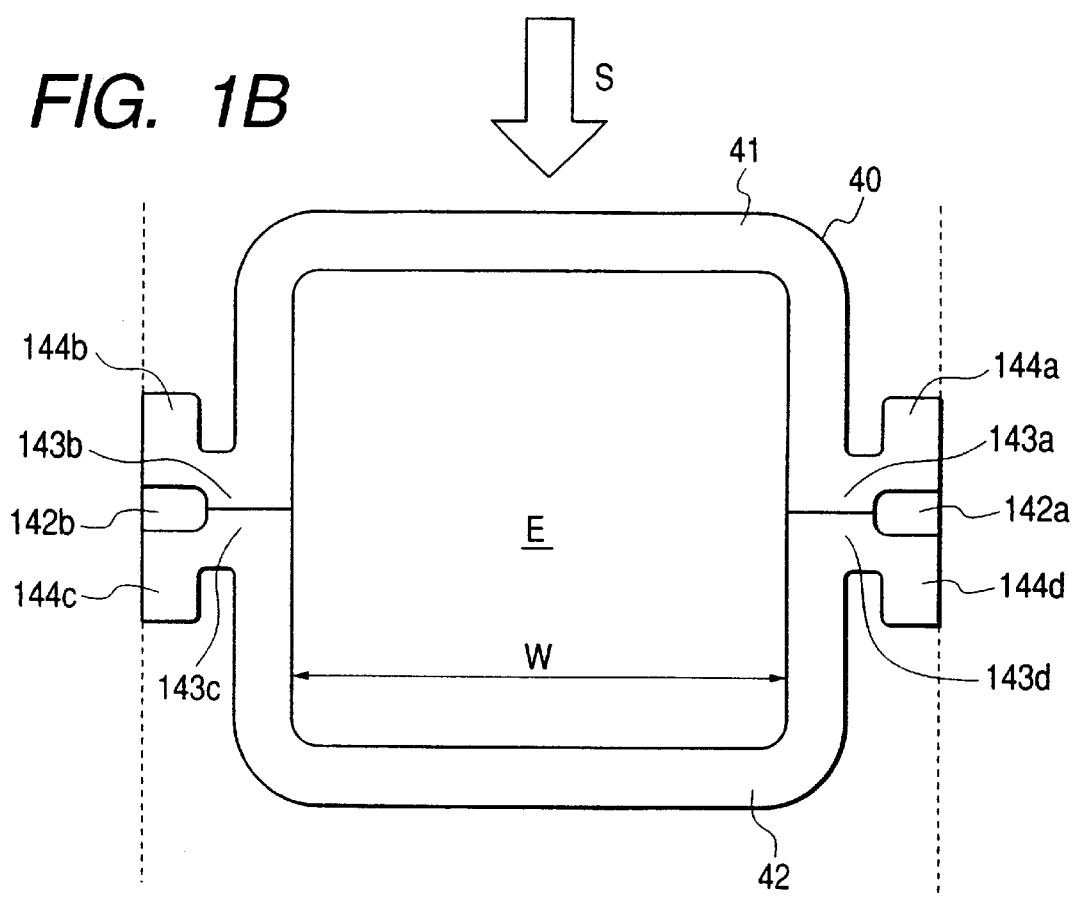
FIG. 1B is a longitudinal section of a conventional hollow body made from a resin.
Figure 1A:
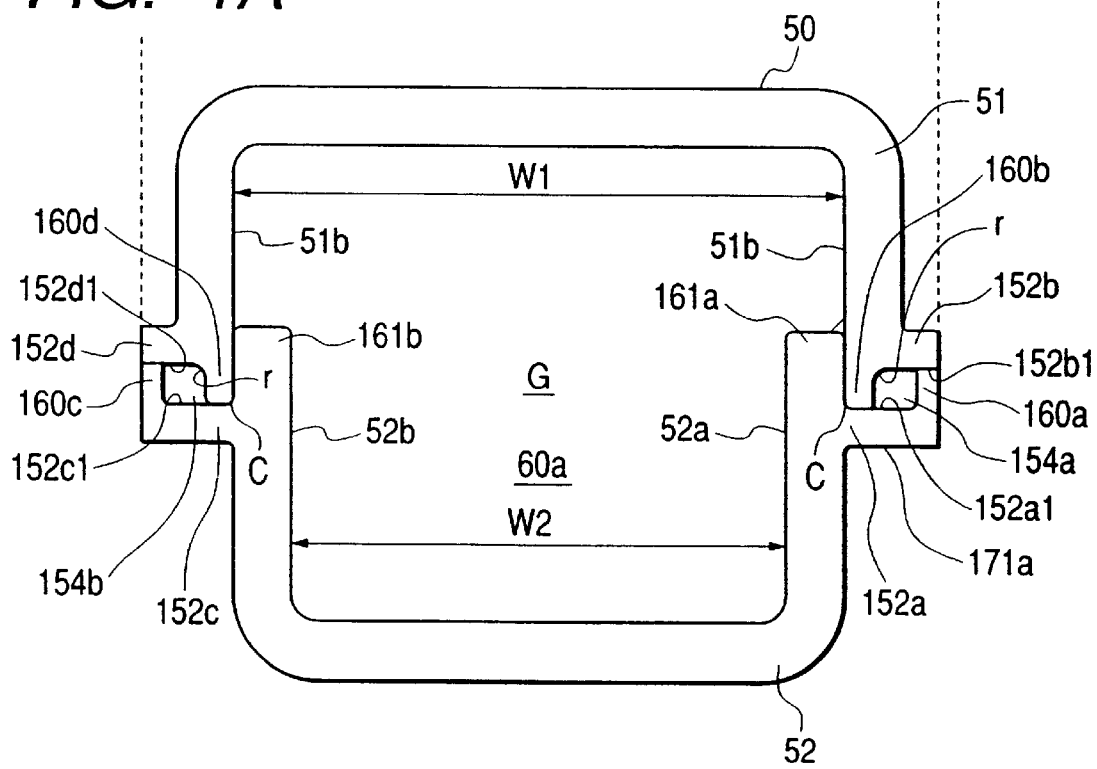
FIG. 1A is a longitudinal section of a hollow body made from a resin according to Embodiment 1 of the present invention.
Figure 12:
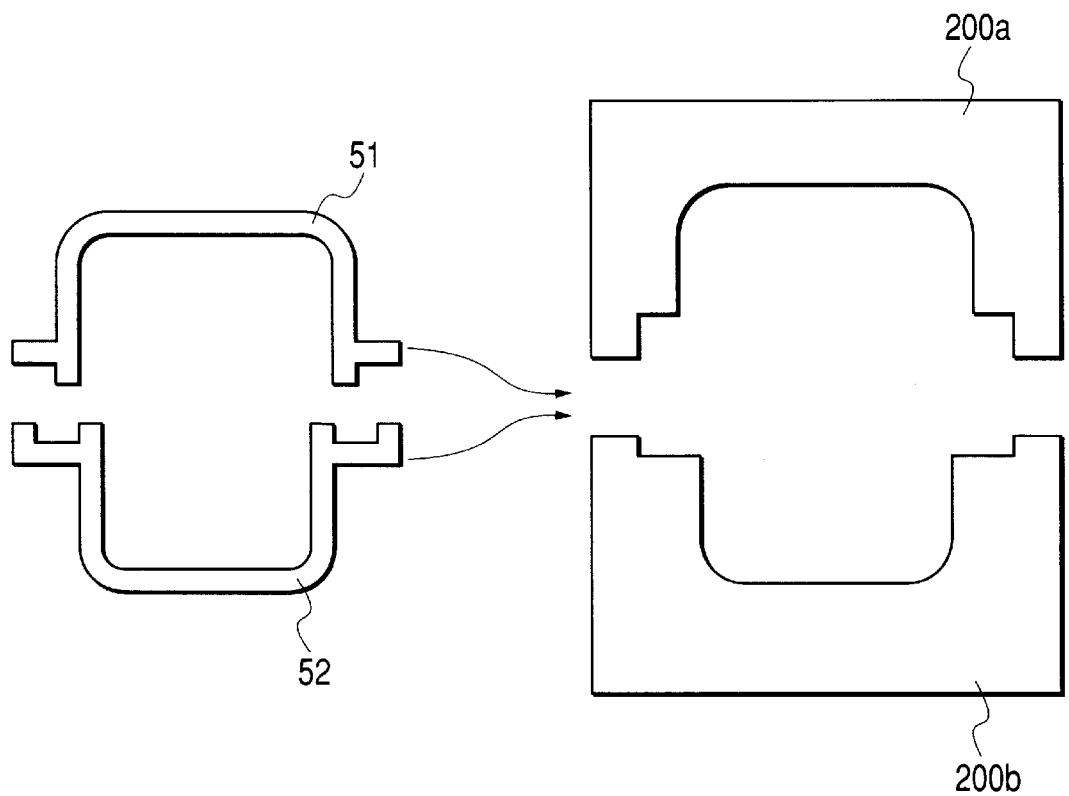
FIG. 12 is a longitudinal section showing the relation between dies for joining of the invention and container parts to be joined.
Figure 13:
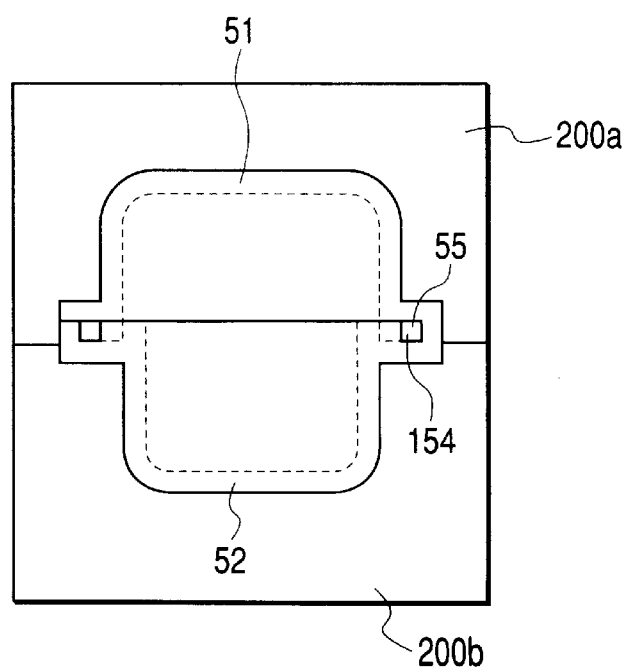
FIG. 13 is a longitudinal section showing a state in which the container parts are set in the dies for joining and a resin is injected into a gap formed by opposed surfaces of approached or touched molded pieces.

FIG. 1A, FIG. 12 and FIG. 13 show Embodiment 1. Embodiment 1 is described by reference to FIGS. 1A, 12 and 13.

Embodiment 1 has the following configuration made in conformity with the following processes. That is, a container part 51 as the main body of the toner container and a container part 52 as the lid, which are at least two molded pieces obtained by the injection molding of plastic, approach or touch each other in dies 200a and 200b different from the unillustrated dies that were used for the formation of the molded pieces. The approaching or touching molded pieces are joined by the injection of a molten resin material for joining into gaps 154 formed between opposed surfaces of the molded pieces. Consequently, the joining of a plurality of parts becomes possible, and the freedom of designing is improved. And further, the assembling of the parts becomes simplified.

In FIGS. 1A and 1B, the arrow S indicates a projection direction of the hollow body made of resin. When the hollow bodies are projected in the direction indicated by the arrow S, a projected area of the hollow body made of resin in FIG. 1A can be made larger than a projected area of the hollow body made of resin in FIG. 1B.

The joined portions do not include all of the gaps formed by the opposed surfaces of the approaching or touching molded pieces. This is an indispensable matter for the decrease of the amount of deformation of a joined body. Moreover, the adoption of a configuration such that the flow of resin is stopped by a rib formed in a direction to prevent a resin channel (that is, in a direction perpendicular to the channel) makes it possible to select a portion where joining is performed intentionally.

Figure 14:
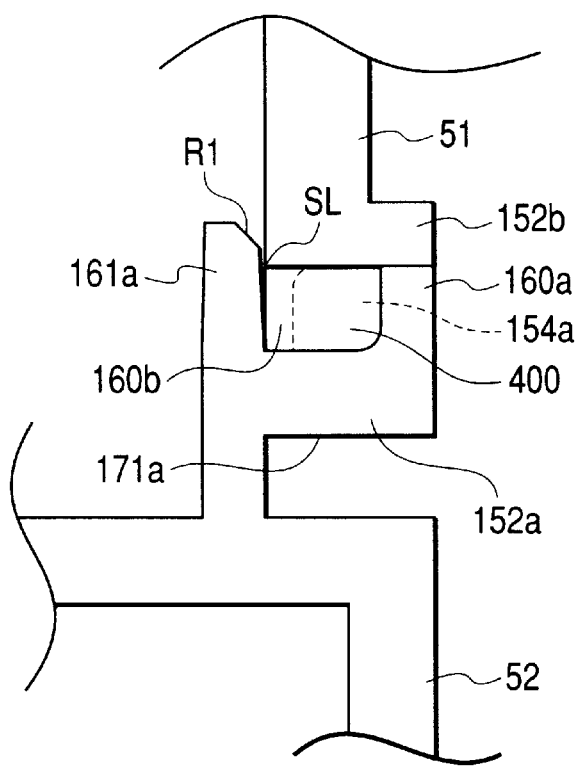
FIG. 14 is a longitudinal section showing the gap of the Embodiment 1 of the invention.
Figure 15:
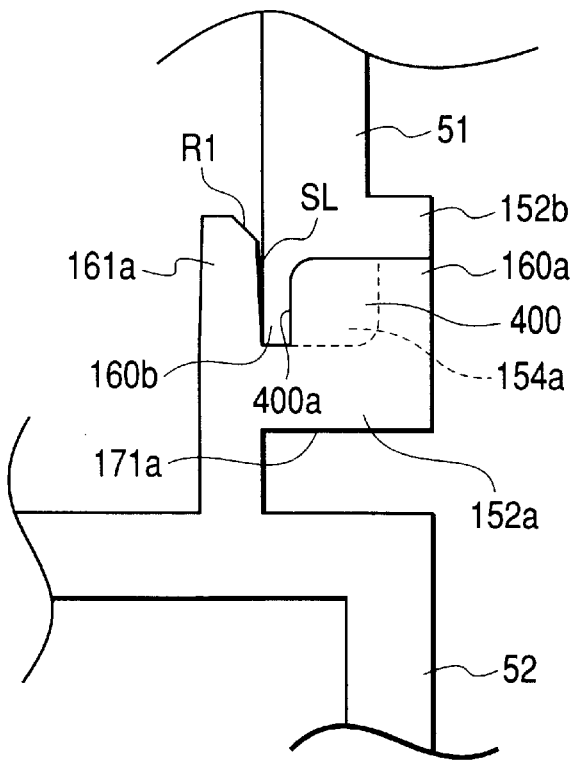
FIG. 15 is a longitudinal section showing the gap of the Embodiment 1 of the invention.

If the gaps 154 are formed on the entire circumferences of the molded pieces, the amount of shrinkage of the pouted resin in the flowing direction thereon may become large (the resin is shrunk as the resin drops in temperature from the melting temperature), and thus, there is the possibility that the molded pieces to be joined are deformed. Accordingly, as shown in FIG. 14 or FIG. 15, a rib 400 for stopping resin is formed in each of the gaps 154. The rib may preferably be formed perpendicularly to the flow direction of the molten resin in each of the gaps 154 which comprise four gaps, three of which are denoted by reference characters 154a, 154b, and 154c formed by the opposed surfaces of the approaching or touching molded pieces. However, it is not necessary for the direction to be perpendicular, but may be any direction as long as the rib can stop the flow of the molten resin. Consequently, at the places where the rib 400 for stopping resin exists, a notch is formed in each of ribs 160a, 160b, 160c and 160d for preventing the interference with the rib 400 for stopping resin. Or, as shown in FIG. 15, the ribs 400 for stopping resin are formed into a shape 400a having a notch for preventing the interference with the ribs 160a–160d. The thing for stopping resin is now called a rib, but even a rib having a large width (in the lengthwise direction of the gap formed by the opposed surfaces of the approaching or touching molded pieces) and not having a so-called rib has a function for stopping resin. Consequently, the present invention includes such a case. The positions of the ribs 400 are, for example, near the corners of the container part 52 as the lid of the toner container as shown in FIG. 2.

(Embodiment 2)

Figure 2:
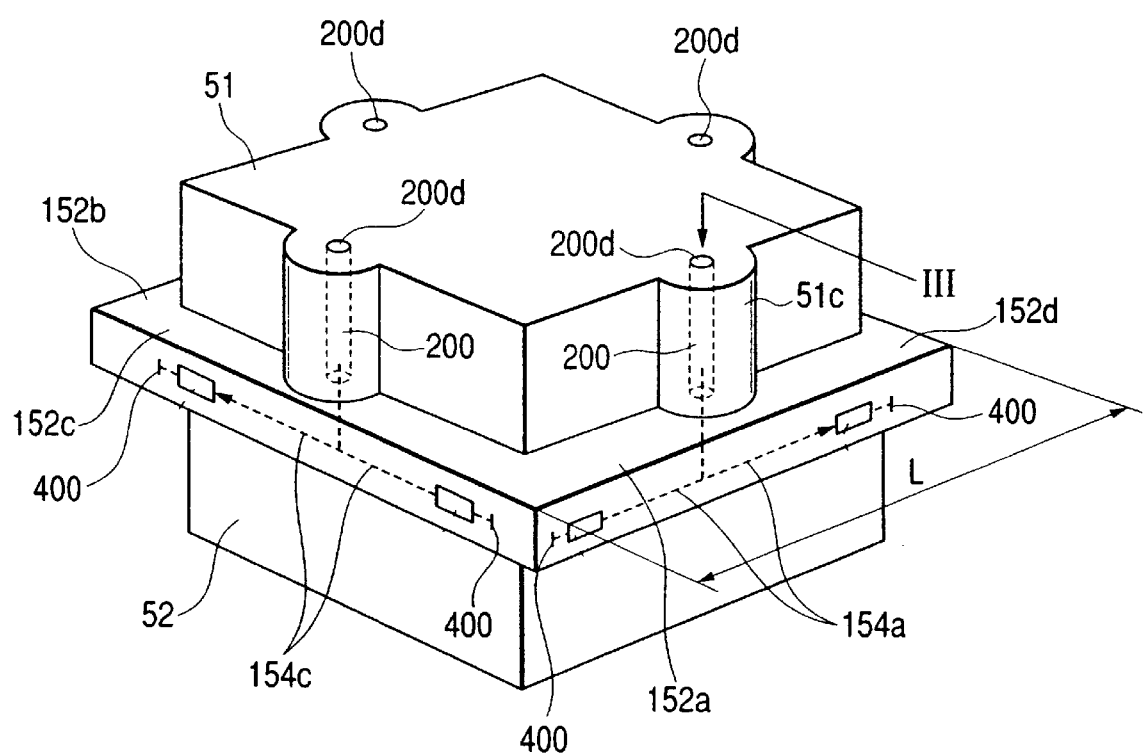
FIG. 2 is a perspective view of a hollow body according to Embodiment 2 of the present invention.

As shown in FIG. 1A and FIG. 2, in a configuration in which at least two container parts 51 and 52, as molded pieces obtained by the injection molding of plastic, approach or touch each other in dies and the container parts 51 and 52 are joined by the injection of a molten resin material for joining into gaps 154a and 154b, the constitution of the joining portions are composed of flange portions 152a, 152b, 152c and 152d formed on the approaching or touching container parts 51 and 52 and ribs 160a, 160b, 160c and 160d formed in the die cutting direction from the flange portions 152a, 152b, 152c and 152d, respectively. Moreover, in addition to the ribs 160a, 160b, 160c and 160d, the configuration includes ribs 161a and 161b, formed in the die cutting direction like the ribs 160a, 160b, 160c and 160d, for preventing the deformation of the ribs 160b and 160d formed in the die cutting direction from the container part 51 having the flange portions 152b and 152d at the time of the injection of the molten resin material for joining into the gap 154a and 154b. Consequently, the container 50 having the flange portions 152b and 152d shorter than those of the conventional container 40 has less restrictions on the designing of product by that extent like the following.

That is, because it becomes possible to increase the internal volume G thereof, it also becomes possible to decrease the projected area thereof as a unit as a result.

And, at the time of manufacturing (molding), the configuration for die cutting can also be selected.

(Embodiment 3)

Figure 9:
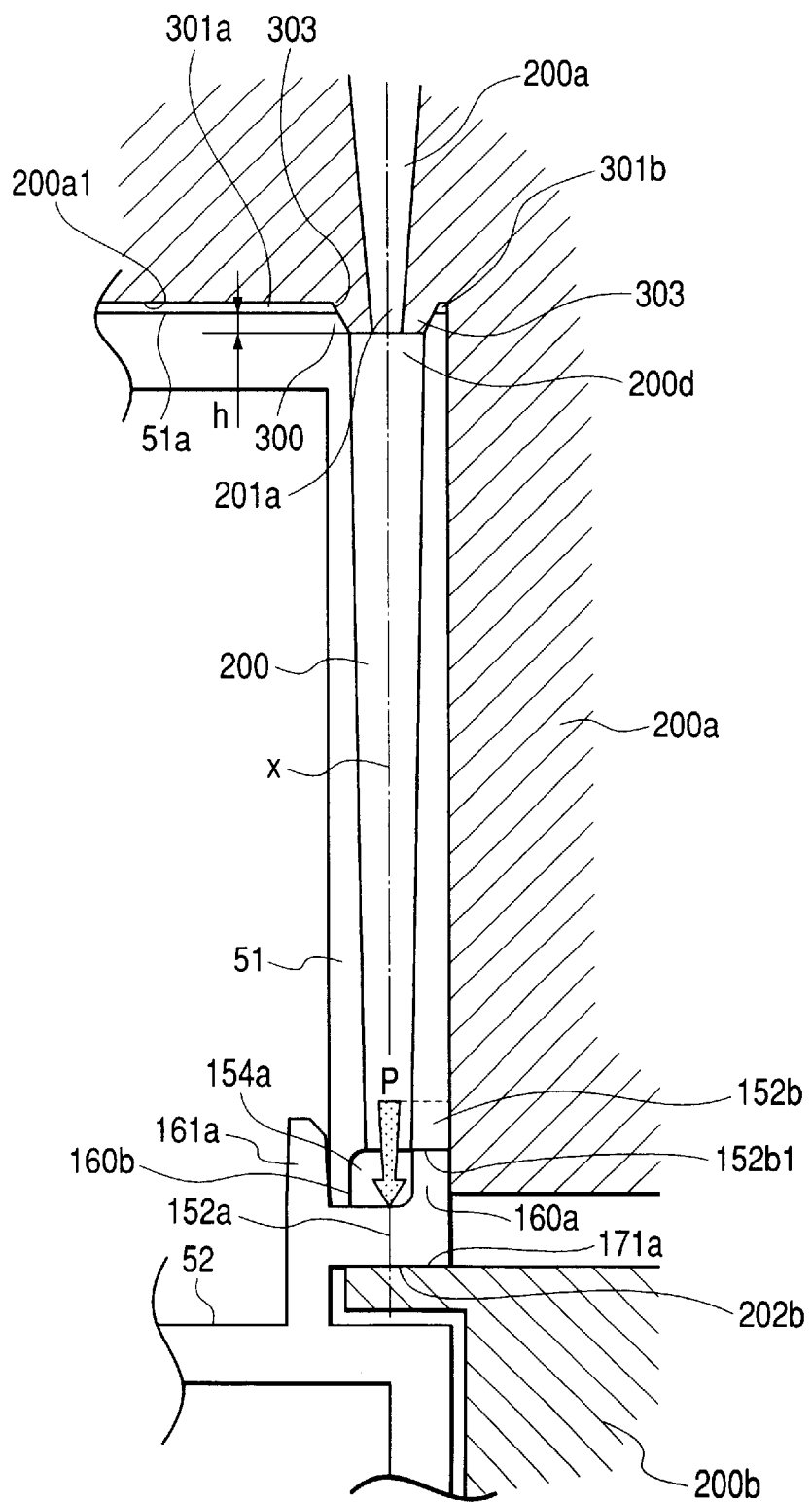
FIG. 9 is a cross section taken along the IV—IV line in FIG. 3 showing the relation between a gate of a die and a resin channel (in the case where products are closely disposed)

As shown in FIG. 1A and FIG. 9, Embodiment 3 has a configuration in which the thicknesses of the ribs 160a and 160b (160c and 160d) formed in the die cutting direction from the flange portions 152a and 152b (152c and 152d) formed on each of the container parts 51 and 52 are within a range of 0.3 mm to 2.5 mm in the joining configuration of Embodiment 2. Consequently, when a material for joining is injected into the gaps 154a and 154b, the ribs 160a and 160b (160c and 160d) are deformed perpendicularly to the flowing direction of the material and radially by the pressures working from the centers of the gaps 154a and 154b, and then the ribs 160a and 160b respectively adhere to the die 200a and the supporting rib 161a formed on the container part 52 being the other party. Consequently the material for joining injected into the gaps 154a and 154b does not leak in the inside of the container 50.

(Embodiment 4)

Embodiment 4 has a configuration in which the cross-sectional areas 55 (see FIG. 13) perpendicular to the resin flowing direction at the molten resin injection portions are severally within a range of 1 m$^2$ to 9 mm$^2$ in the joining configuration of Embodiment 2. Consequently, the cross-sectional areas 55 of the gaps 154a and 154b as the molten resin injection portions can be determined on the basis of bonding strength and the length (region) L (see FIG. 2) where joining is desired. In the region L, the container part 51 as the main body of the toner container and the container part 52 as the lid of the toner container have parts adhere to each other and parts at which the container parts 51 and 52 are integrally connected with each other with the gaps 154.

(Embodiment 5)

FIG. 1A is a longitudinal section of a hollow body made from a resin also according to Embodiment 5. Incidentally, because the longitudinal section perpendicular to FIG. 1A is also a similar configuration except that the largeness thereof in the horizontal direction is different, the longitudinal sections are described by reference to FIG. 1A representatively.

FIG. 1A shows Embodiment 5 of the present invention, and FIG. 1B shows a conventional hollow body for the comparison with Embodiment 5 of the invention.

Two container parts 51 and 52, which are obtained by the injection molding of plastic and are severally a molded piece, approach or touch each other in unillustrated dies, and the container parts 51 and 52 are joined to each other by the injection of a molten resin material for joining into the gaps 154a and 154b.

Now, Embodiment 5 has the flange portions 152a, 152b, 152c and 152d at the portions where several portions of the container parts 51 and 52 approach or touch each other. The flange portions 152b and 152d of one container part 51 on the upper side are provided with the ribs 160b and 160d that are ribs formed in the die cutting direction along the edge of the container part 51 and are touched to the flange portion 152a and 152c of the other container art 52 on the lower side.

The ribs 160b and 160d of the container part 51 vertically extend (in the die cutting direction). Moreover, the inner wall 51b of the container part 51 is situated on the same planes as each side face on one side of the ribs 160b and 160d. The flange portions 152b and 152d of the container part 51 are outside flanges on the outer periphery side of the container part 51, and have horizontal flange surfaces 152b1 and 152d1. The thicknesses of the ribs 160b and 160d perpendicular to the die cutting direction are within a range of 0.3 mm to 2.5 mm. The top faces of the ribs 160b and 160d are horizontal planes. The corners of the ribs 160b an 160d on the inside of the container part 51 are chamfered (chamfering C).

The flange portions 152a and 152c of the other container part 52 on the lower side are provided with ribs 160a, 160c formed along the edges of the container part 52 in the die cutting direction. The gaps 154a and 154b are defined by the ribs 160a, 160c and the ribs 160b, 160d of the container part 51. The ribs 160a and 160c abut against the flange portions 152b and 152d of the container part 51, respectively. The ribs 160b and 160d of the container part 51 respectively abut against the horizontal flange surfaces 152a1 and 152c1 of the flange portions 152a and 152c. Herein, the ribs 160a and 160c are formed in the die cutting direction (vertical direction).

The container part 52 on the lower side is provided with the ribs 160a and 160c in parallel to each of the ribs 161a and 161b, which will be described later, respectively. The ribs 160a and 160c have outer side faces flush with the tips of the flanges 152a and 152c, respectively. The flange portions 152a and 152c are situated on the outer periphery side of the container part 52. The ribs 160b and 160d of the container part 51 come in contact with the flange surfaces 152a1 and 152c1 of the flange portions 152a and 152c, respectively. The thicknesses of the ribs 160a and 160c perpendicular to the die cutting direction are within a range of 0.3 mm to 2.5 mm.

Each height of the ribs 160a, 160b, 160c and 160d formed on the flange portions 152a, 152b, 152c and 152d of the container parts 51 and 52 from the flange surfaces 152a1, 152b1, 152c1 and 152d1 is the same.

Corners of respective ribs 160a, 160b, 160c and 160d on the base side on the side of the gaps 154a and 154b are severally rounded in a radius r (the reference sign r is denoted in FIG. 1B on only one side). The heights of the ribs 160b and 160d of the container part 51 and the ribs 160a and 160c of the container part 52 are the same. Consequently, in a state such that the molten resin for joining is not injected into the gaps 154a and 154b, the gaps 154a and 154b are spaces having a rectangular shape in section and severally have a radius at a corner on one diagonal position.

Each of the ribs 160a, 160b, 160c and 160d are formed in such a way that they surround the edges of the container parts 51 and 52. That is, any of the shapes of the edges of the container parts 51 and 52 cut vertically in the inside to the outside direction is the same as FIG. 1A.

Now, the cross-sectional areas of the gaps 154a and 154b are within a range of 1 to 9 mm$^2$. Because the cross-sectional areas of the gaps 154a and 154b are substantially a square, the height of each of the ribs 160a, 160b, 160c and 160d is about 1 to 3 mm.

The other container part 52 is provided with the supporting ribs 161a and 161b on the inside of the respective ribs 160b and 160d of the container part 51 for the prevention of the ribs 160b and 160d to the inside 60a of the container 50 at the time of the injection of the molten resin material into the gaps 154a and 154b. The ribs 161a and 161b have the side faces on the same planes of the inner walls 52a and 52b of the container part 52.

The container part 52 has one plane inner walls 52a and 52b, and the inner walls 52a and 52b extend over the flange portions 152a and 152c as the side faces of the supporting ribs 161a and 161b. The height of the supporting ribs 161a and 161b is substantially the same as the height of the gaps 154a and 154b formed upwardly from the positions of the flange surfaces 152a1 and 152c1 added to the height of the thickness of the flange portions 152b and 152d of the container part 51, respectively. The thicknesses of the supporting ribs 161a and 161b are set to be substantially equal to the thicknesses of the container part 52. That is, when force is applied to the supporting ribs 161a and 161b owing to the deformations of the ribs 160b and 160d as it will be described later, it is necessary to reduce the deformation quantities of the supporting ribs 161a and 161b themselves to be small.

FIG. 1A shows an embodiment of the present invention, and FIG. 1B shows the related art.

The widths of the completed synthetic resin hollow body of both of the containers of the related art and the embodiment of the present invention are the same now. In FIGS. 1A and 1B, two dotted lines are parallel lines and severally pass through the end surfaces of the flanges showing the widths of the related art and the present invention. In the related art, the inner dimensions of the lid 41 of the toner container and the toner container 42 in the width direction are the same, "W". In the embodiment of the present invention, the size W1 between the inner walls 51b, which is the inner dimension of the container part 51, is larger than the distance W between the inner walls of the toner container 42 of the related art. Moreover, the distance W2 between the inner walls of the container part 52 is equal to the distance W between the inner walls of the related art. Moreover, the heights of the synthetic resin hollow bodies of the related art and the present embodiments are the same.

Consequently, if the sizes in the lengthwise directions of the toner container 42 of the related art and the synthetic resin hollow body of the present embodiment are the same, the internal volume G of the present embodiment as a container is larger than the internal volume E of the related art.

Next, the operation of the configuration at the time of the injection of a molten resin for joining is described. In the embodiment, any runner is not shown. A preferable embodiment for forming a runner and a gate is described later. In any case, the molten resin for joining flows into the gaps 154a and 154b through the molten resin injection portions communicating between the outside and the gaps 154a and 154b. Although the ribs 160b and 160d of the container part 51 are deformed toward the inside of the container 50 owing to the pressure operating from the centers of the gaps 154a and 154b, which are formed by the opposed surfaces of the container parts 51 and 52 that are adjacently arranged or abutted against to each other radially and perpendicularly to the flowing direction of the molten resin at the time of the injection thereof, the deformation is prevented by the adhesion of the ribs 160b and 160d to the supporting ribs 161a and 161b, and further the ribs 160b and 160d pressure the ribs 161a and 161b, respectively, to improve the rigidity and the strength of the container 50. Moreover, the ribs 160a and 160c of the container part 52 incline to deform to the outside of the container 50 owing to the aforesaid pressure of the molten resin at the gaps 154a and 154b, but the inclination is prevented by the abutting of the outside faces of the ribs 160a and 160c against unillustrated dies. Incidentally, it is better that the heights of the supporting ribs 161a and 161b from the flange surfaces 152a1 and 152c1 are higher than at least the heights of the ribs 160b and 160d. On the other hand, it is better that the supporting ribs 161a and 161b are lower for the increase of the internal volume G of the inside 60a.

Incidentally, although the ribs 160a and 160c on the side of the outer periphery of the container part 52 are pressured by the molten resin in the gaps 154a and 154b being resin channels, the deformed ribs 160a and 160c abut against the dies. Accordingly, smaller values in the aforesaid range of the thicknesses can be adopted as the thicknesses of the ribs 160a and 160c.

Incidentally, for example, high impact polystyrene can be adopted as the material of the container parts 51 and 52. Moreover, for example, polystyrene PS not including flame-retardant additives are adopted as the material to be injected for joining.

(Embodiment 6)

Embodiment 6 forms resin injection channels up to the gaps 154a and 154b on a container part on one side. Because the configuration of the ribs around the gaps 154a and 154b is the same as that of Embodiment 5, the descriptions concerning Embodiment 5 are quoted to the configuration of the ribs of Embodiment 6.

Figure 3:
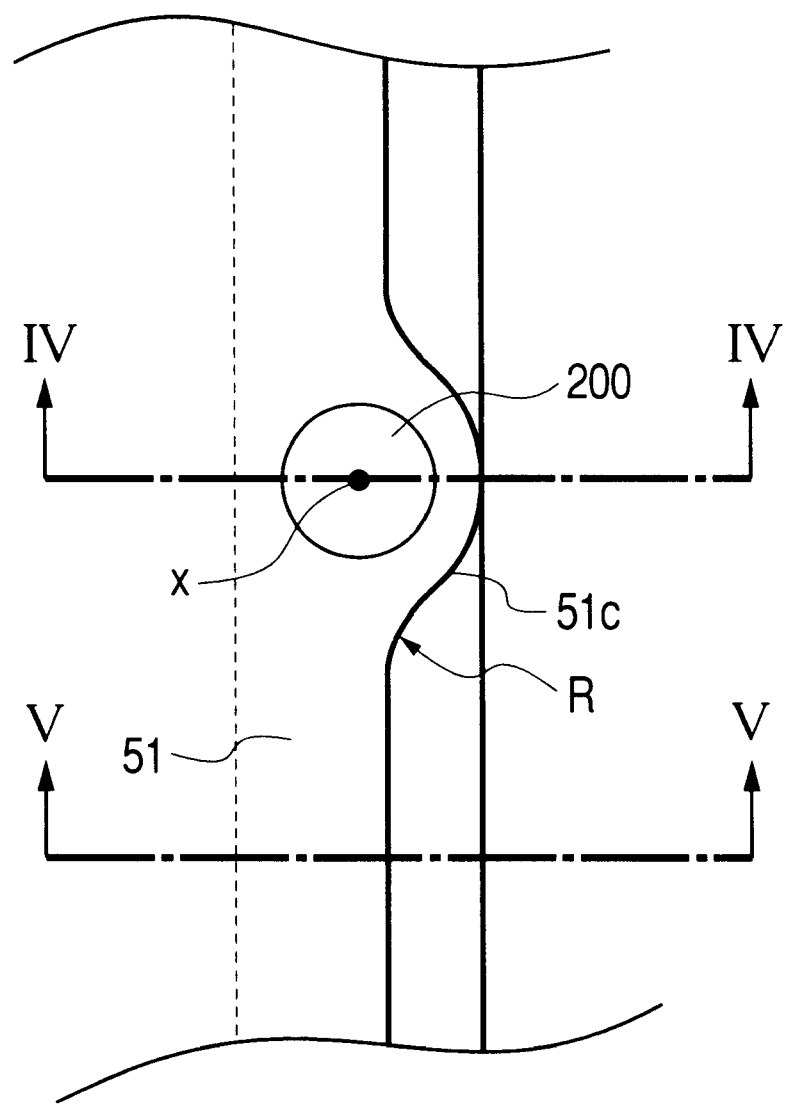
FIG. 3 is a view looking in the direction of the arrow III in FIG. 2.
Figure 5:
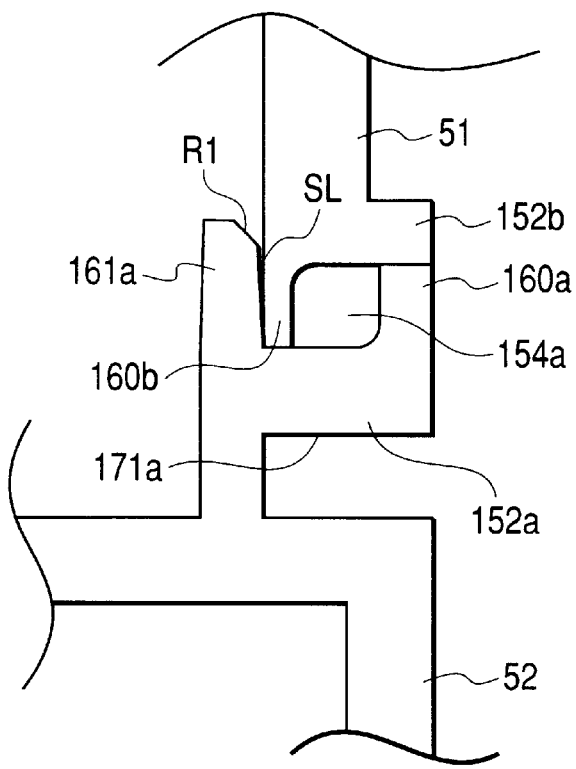
FIG. 5 is a cross section taken along a V—V line in FIG. 3.

FIG. 2 is a perspective view showing the whole of Embodiment 6. FIG. 3 is a view looking in the direction of the arrow III in FIG. 2. FIG. 4 is a cross section taken along a IV—IV line in FIG. 3. FIG. 5 is a cross section taken along a V—V line in FIG. 3.

Embodiment 6 adopts the following configuration. That is, the resin injection channels up to the gaps formed by the opposed surfaces of the container parts that are adjacently arranged and abut against each other are formed on a container part on one side, and the channels penetrate between the gaps and the outside of the container part perpendicularly to the resin flowing directions in the gaps. The penetration direction is the assembling direction at the time of the combining of the container parts.

As shown in FIG. 2, molten resin inflow openings 200d of molten resin injection channels 200 are formed at the positions of the container part 51 on the upper side according to the gates of dies. That is, in the present embodiment in which resin injection channels 200 are formed in one of the container parts 51 and 52, the inflow openings 200d are formed in the container part 51 correspondingly to the intermediate points in the directions along the edges of the container part 51 of the respective flange portions 152a, 152b, 152c and 152d of the container part 51. The same is said of the resin injection channels 200 formed toward the gaps in the respective flanges. In the following, descriptions are given for the gap 154a.

As shown in FIG. 4, the resin injection channel 200 is formed perpendicularly to the resin flowing direction in the gap 154a. In Example 6, the channel 200 is vertical. The channel 200 penetrates the container part 51 between an outside surface 51a of the container part 51 and the gap 154a. For the formation of the channel 200, a pillar-shaped portion 51c is formed from the flange portion 152b to the outside surface 51a in the container part 51 (see FIG. 2). The plane shape of the pillar-shaped portion 51c is an arc around a center axis x of the channel 200 as shown in FIG. 3, and the corners thereof at the joining points with the outside surface of the base material of the container part 51 are rounded to be arcs R.

The channel 200 has a tapered shape such that the inflow opening 200d side of the channel 200 is formed as a bigger diameter portion and the gap 154a side of the channel 200 is formed as a smaller diameter portion 200c.

As shown in FIG. 5, although the relational positions of the respective ribs 160a, 160b and 161a are the same as those of Embodiment 1, the corner of the base side of the supporting rib 161a of the container part 52 on the lower side is not rounded. Corner chamfering R1 and an inclined plane SL are formed on the supporting rib 161a in order that the rib 160b of the container part 51 on the upper side can easily enter into the side face of the supporting rib 161a when the container parts 51 and 52 are assembled such that the parts 51 and 52 are adjacently arranged or abut against each other. Thereby, the side face on the end side of the rib 160b of the container part 51 adheres to the side face on the base side of the supporting rib 161a along the line of the side face of the rib 161a owing to the pressure of the resin flowing into the gap 154a. Consequently, the supporting ribs and the ribs of the container part 51 adhere to each other over the entire circumference of the joining portions of the container parts 51 and 52.

According to the embodiment, because gate portions of dies can be connected with the molten resin injection channels 200 on the outside surface 51a side of the container part 51, as shown in FIG. 7, it is not necessary to provide the side gate 72 adjacently to the gap 142a, and the dies for the use of the joining of the container parts 51 and 52 can be reduced from the point of view of projected areas of products. On the contrary, in the related art shown in FIG. 7, because the side gate 72 is disposed on the side of the gap 142a, runners should be provided in radial directions from the outside of the lid 41 of the container and the body 42 of the container. Consequently the dies are large.

According to the present embodiment, as shown by an arrow Q in FIG. 4, a gate of a die can be connected with the inflow opening 200d of the resin injection channel 200. Then, when a molten resin flows into the channel 200, the resin is not caked on the midway of the channel 200 and the gate sealing is performed in the vicinity of the small diameter portion 200c where the gap 154a and the channel 200 intersect each other, because the channel 200 is in a shape of a taper. Consequently, because the resin injected into the gap 154a under a pressure does not flow backward to the channel 200, the resin in the gap 154a is caked in a state in which the ribs 160a and 160b are respectively pressured by the die 200a (see FIG. 9) and the supporting rib 161a.

(Embodiment 7)

According to Embodiment 6, the resin flowing in the channel 200 flows like an arrow 71b shown in FIG. 6 at the gap 154a and collides with the flange portion 152a of the container part 52. Thereby, a force P acts on the flange portion 152a owing to the variation of the kinetic momentum of the molten resin. Because the flow velocity of the resin flowing in channel 200 is large and the mass of the resin is also large, the force P becomes large.

Accordingly, in the present embodiment, as shown in FIG. 9, an undersurface 171a of the flange 152a of the container part 52 on the lower side is supported by a supporting surface 202b formed on the die 200b for the support of the container part 52.

As described above, because the supporting surface 202b of the die 200b is formed such that the supporting surface 202b crosses the extension line of the center axis x passing through the gate of the die 200a and the channel 200, the pressure imposed on the flange portion 152a by the jet stream of the injected resin material does not cause a quality problem of the deformation of the flange portion 152a because the flange portion 152a is supported by the supporting surface 202b of the die 200b. Moreover, restrictions on manufacturing such as the selection of a high flow material, the increase of the number of gates, and the like are not generated. Even if the injection pressure of the molding of the container 50 and so forth is set at a pressure higher than an ordinary pressure, the quality problems such as deformation are not generated in units after joining.

Because the velocity energy of the resin flowing in the resin channel being the gap formed by the opposed surfaces between the container parts that are adjacently arranged and abutted against each other is rapidly lost to be converted into a static pressure, the static pressure becomes a large pressure pressuring the peripheral walls of the gap. However, as mentioned above, the ribs of the container part on the upper side are supported by the ribs of the container part on the lower side.

In the present embodiment, the joining configuration of the container is as follows. That is, the thicknesses of the ribs 160a, 160b, 160c and 160d formed in the die cutting direction from the flange portions 152a, 152b, 152c and 152d formed on the container parts 51 and 52 are within a range of 0.3 mm to 2.5 mm. When a material for joining is injected into the gaps 154a and 154b, the ribs 160a, 160b, 160c and 160d are deformed by the pressure acting from the center of the gaps 154a and 154b perpendicularly an radially to the flowing direction, and the ribs 160a, 160b, 160c and 160d respectively adhere to the die 200a and the supporting ribs 161a and 161b formed on the other party container part. Thereby, there is no case where the material for joining that has flowed into the gaps 154a and 154b leaks inside or outside the container 50. Although the supporting ribs 161a and 161b are pressured by the molten resin in the gaps 154a and 154b with the ribs 160b and 160d put between them at this time, the pressure is decreased owing to the deformation of the ribs 160a and 160d. Then, after the adhesion of the ribs 160a and 160d and the supporting ribs 161a and 161b, the ribs 160a and 160b and the supporting ribs 161a and 161b cooperatively oppose the pressure from the molten resin in the gaps 154a and 154. Incidentally, the thicknesses of the supporting ribs 161a and 161b are substantially the same as that of the base material of the container part 52 in the present embodiment.

Next, Embodiment 8 in which sealing performance between the gates of a die and molded pieces being container parts is heightened around gates is described.

(Embodiment 8)

Figure 8:
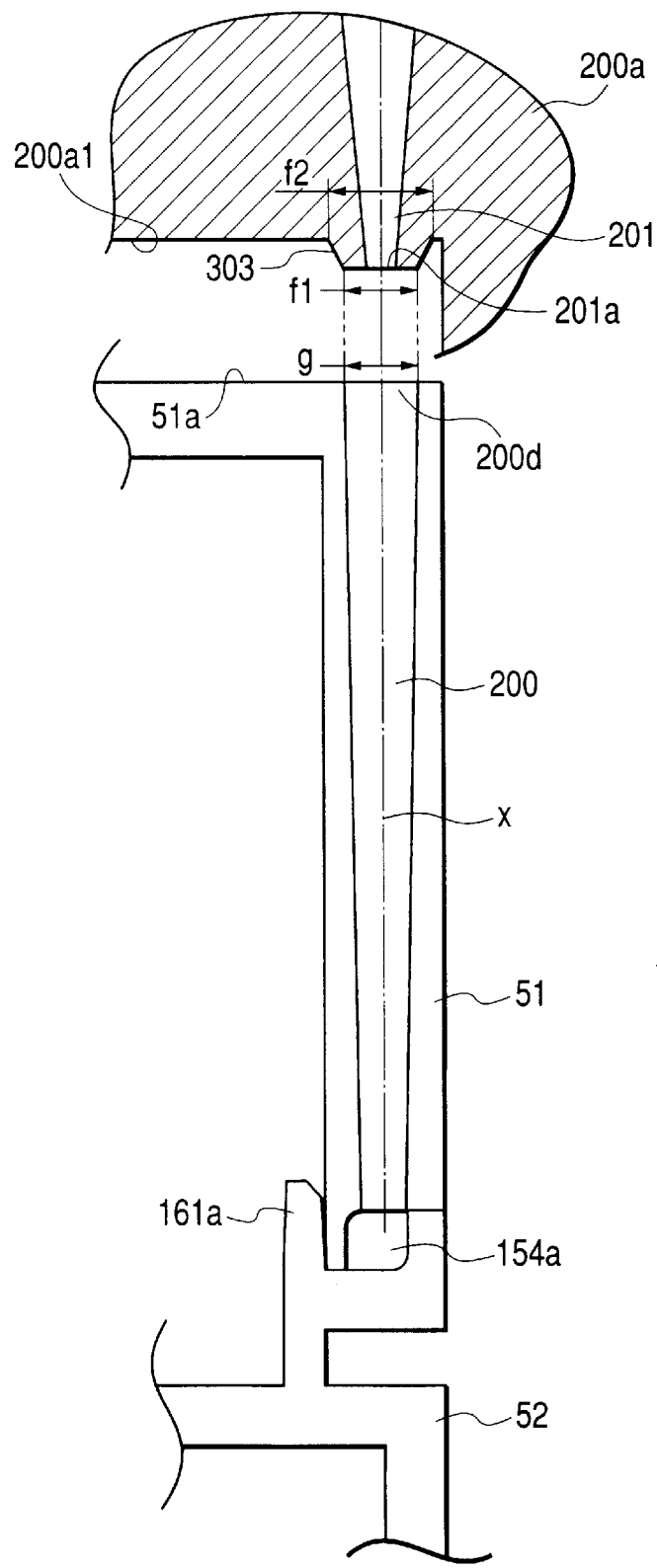
FIG. 8 is a cross section taken along the IV—IV line in FIG. 3 showing the relation between a gate of a die and a resin channel.

FIG. 8 and FIG. 9 show Embodiment 8.

Embodiment 8 prevents the leakage of resin to the outside at a portion where the resin injection channel 200 is connected with a gate in the case where such a channel is formed as shown in Embodiment 7. In Embodiment 8, the tip portion of a die at which a gate, in the terminology of molding techniques, which is an inlet of a molten resin material for joining, is formed, accords with the outside surface of the inlet of the resin channel of a container part forming the resin channel or is recessed in the resin channel from the outside surface.

As shown in FIG. 8, the respective center axes x of the gate 201 formed in the die 200a and the resin injection channel 200 of the container part 51 on the upper side align with each other. Suppose that the diameter of the inflow opening 200d of the channel 200 is "g", a truncated one portion 303 having the center of the center axis x projects downward from the upper surface 200a1 of the die 200a. The gate 201 is formed in the die 200a such that an inlet 201a is situated at the top surface of the truncated cone portion 303. Incidentally, the under surface 200a1 of the die 200a is parallel with the outside surface 51a of the container part 51 on the upper side.

In the embodiment mentioned above, if the diameter of the top portion of the truncated cone portion 303 is f1 and the diameter of the bottom portion thereof is f2, the diameter g of the inlet portion f the resin injection channel 200 satisfies the relation: f2>g>f1. In FIG. 8, the diameter f1 is set to be indefinitely close to the diameter g of the inlet portion. The inner diameter of the inflow opening 200d of the resin injection channels 200 is within a range of 1.5 mm to 3.00 mm, and the inner diameters of the portions facing the gaps 154 and at which molten resin flows into the gaps 154 are within a range of 0.8 mm to 2.5 mm. That is, the channel 200 is formed as a taper having a large diameter portion of the inflow opening 200d. The taper is 1 degree to 6 degrees when it is expressed by an angle.

In FIG. 8, when the die 200a is moved downward, the top portion of the truncated cone portion 303 is brought into pressure contact with the circumference edge of the inflow opening 200d of the channel 200 of the container part 51 to deform the portion around the opening 200d and to seal the portion connecting the gate 201 with the channel 200. Consequently, the molten resin does not leak to the outside from the portion between the inlet 201a of the gate 201 and the opening 200d of the channel 200.

In the form shown in FIG. 9, a chamfering 300 adhering to the truncated cone portion 303 is previously formed on the container part 51 around the opening 200d of the channel 200. Also in such a configuration, the molten resin does not leak from the portion where the opening 200d of the channel 200 is connected with the gate 201 of the die 200a. That is, the truncated cone portion 303 is closely pressed against the chamfering 300 of the opening 200d. In the state such that the truncated cone portion 303 is pressed against the chamfering 300, the container part 51 and the under surface 200a1 of the die 200 form gaps 301a and 301b.

In the embodiment shown in FIG. 9, the insertion amount h of the truncated cone portion 303 being the tip portion of the die forming the gate 201 into the inside of the inflow opening 200d from the outside surface 51a in the inflow opening 200d portion of the resin injection channel 200 of the container part 51 is within 10 mm.

As mentioned above, a sealing portion in the shape of a cone surface is for sealing a portion between a die and a container part by pressing the die forming a gate against an inlet of a resin injection channel of the container part closely. Thereby, the molten resin does not leak out from the gate of the die and the inlet of the resin injection channel of the container part.

The die 200a reaches, as shown in FIG. 9, the lower part of the portion appearing to the outside of the contact surface of the flange surface 152b1 of the container part 51 on the upper side with the rib 160a of the container part 52 on the lower side to approach the side face of the container parts 51 and 52.

In the above descriptions, although the truncated cone portion is dealt as a part of the cone, the portion around the gate is not necessarily the cone, but the portion may be configured with a cone being a rotation body having a generating line of a curve of the second order that approximates a straight line.

(Embodiment 9)

Figure 10:
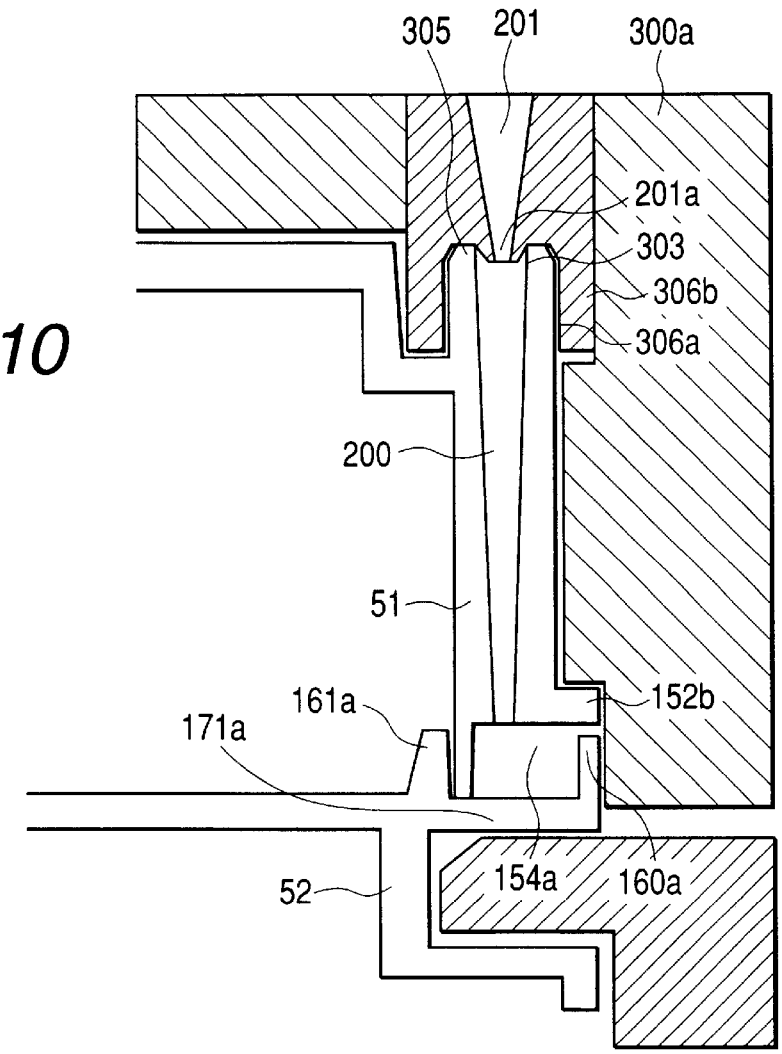
FIG. 10 is a cross section showing another embodiment related to the vicinity of an inflow opening of the resin channel.
Figure 11:
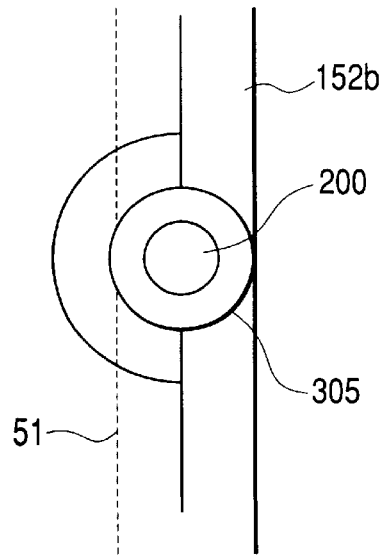
FIG. 11 is a plan view of container parts when dies are removed in FIG. 10.

FIG. 10 shows Embodiment 9.

The whole shape of the joining portion of Embodiment 9 is substantially same as FIG. 2, but the configuration around an inflow opening of the resin injection channel 200 of Embodiment 9 differs from that of FIG. 2.

A cylindrical projection portion 306b projects downward from a die 300a for pressing the container part 51 on the upper side. A cylindrical recessed portion 306a is formed at the center of the cylindrical projection portion 306b, and the inlet 201a of the gate 201 is situated at the center of a truncated cone portion 303 formed at the center of the bottom surface of the cylindrical recessed portion 306a.

A cylindrical boss 305, which fits in the cylindrical recessed portion 306a of the die 300a with a gap, is formed around the inflow opening of the resin injection channel 200 of the container part 51. In a state such that the peripheral surface of the truncated cone portion 303 of the die 300a is pressed against the circumference of the inlet portion of the resin injection channel 200, the tip of the cylindrical projection portion 306b of the die 300a is separated from the container part 51. Besides, the portions of the die 300a other than the portion where the circumference of the inlet portion of the resin injection channel 200 is in contact with the truncated cone portion 303 around the inlet 201a of the gate 201 are sufficiently separated from the container part 51 on the upper side except for the portions of the die 300a corresponding to the flange 152a of the container part 51 and the rib 160a of the container part 52 on the lower side.

In the present embodiment, a cylindrical recessed portion having a diameter larger than that of the inlet of a gate is formed continuously to the gate outside the inlet of the gate of a die; and a cylindrical boss, which is fitted to the recessed portion with a gap, and the tip of which abuts against the bottom of the recessed portion, is formed around the inlet of a resin channel of a container part. If a resin is injected from the inlet of the resin injection channel 200 to the gaps 154a and 154b formed by the container parts 51 and 52 toward the gaps 154a and 154b, and if a force acts on the container part 51 forming the resin injection channel 200 in the direction of the outer periphery of the container part 51, the outer periphery of the cylindrical boss 305 around the inflow opening of the resin injection channel 200 of the container part 51 and the inner periphery of the cylindrical recessed portion 306a of the die 300a closely adhere to each other. Consequently, the resin does not leak out to the outside of the container part 51 owing to the cracking and the like of the container part 51.

The gap between the cylindrical recessed portion 306a of the die 300a and the cylindrical boss 305 around the inflow opening of the resin injection channel 200 is preferably 0.3 mm or less.

The process cartridge shown in FIG. 18 is assembled as follows. That is, both the side faces in the lengthwise direction of the cleaning container 14 being the first frame integrating the cleaning blade 1, the charging means 17 and the photosensitive drum 15 and both the side faces in the lengthwise direction of the toner container 50 being the second frame integrating the agitating members 50e and 50f and a developer are provisionally combined with the side covers 37 and 38 being the third frame and the fourth frame in a state such that the cleaning container 14 and the toner container 50 are adjacently arranged or abutted against each other (same as the state shown in FIG. 19). After that, the provisionally combined bodies are fitted into the aforesaid dies and positioned. In such a state, a molten resin is injected into the gaps formed by the opposed surfaces of the container parts that are adjacently arranged or abut against each other for joining. Or, the side covers 37 and 38 may be adjacently arranged or abutted against each other in the dies after the integration of the cleaning container 14 and the toner container 50 in the dies.

In this case, the molten resin injection channels 200 (continuing the inflow openings 200d although the channels 200 are not shown in FIG. 18) are formed on the side covers.

Incidentally, the definitions of words and phrases that are used for the descriptions of the present embodiments are briefly described in the following.

A "provisional connection" is the connection lest the dies for joining should be separated at the time of insertion by the use of a snap fit, fittings, a jig and the like.

An "adjacent arrangement" is the arrangement of two parts with a gap being 1.5 mm or less between them.

The term "abutting" refers to the state such that no gap is formed between two parts.

A gap formed by the opposed surfaces between the Mar. 19, 2003 container parts is a gap formed by the opposed surfaces having an area substantially within a range of 1 mm$^2$ to 13 mm$^2$. However, the phrase is not necessarily interpreted to be within the range when the phrase is used in claims. The range may appropriately be modified according to the contents of the invention.

As described above, because, in the configurations of the aforesaid embodiments, resin is injected from the outside of a unit molded piece, positions to be joined are not restricted to the outer peripheries of the gaps formed by the opposed surfaces of the container parts that are adjacently arranged or abut against each other. That is, the positions to be joined can arbitrarily be set.

Furthermore, when a material not including flame-retardant additives is adopted as an injection material to be used for joining, high flow and flame-retardant gases are not generated. Consequently, high cohesive strength can be obtained.

Furthermore, when ribs for preventing the flow of resin are formed in resin inflow portions of the gaps formed by the opposed surfaces between container parts that are adjacently arranged or abut against each other, the resin can be stopped by the ribs. That is, intentional selection of joining portions becomes possible.

According to the aforesaid embodiments, the aforesaid configurations of hollow bodies made from synthetic resin and their manufacturing methods can obtain preferable effects when they are applied to an electrophotographic image forming apparatus, a toner supplying container and a process cartridge.

As described above, according to the present invention, workability can be improved.

While the invention has been described with reference to the structure disclosed herein, it is not confined to the details set forth and this application is intended to cover such modifications or changes as may come within the purposes of the improvements or the scope of the following claims.

What is claimed is:

1. A part connecting member made from a synthetic resin, said member to be used to connect at least two molded pieces obtained by injection molding of plastic that are provisionally connected by being adjacently arranged or abutted against each other, wherein the provisionally connected molded pieces are set in dies which are different from a die used for formation of each of said molded pieces, wherein said part connecting member comprises a synthetic resin injected as molten resin into a gap formed between opposed surfaces of the molded pieces that are adjacently arranged or abutted against each other to connect the molded pieces, flowing through an injection channel for the molten resin up to the gap formed in one of the molded pieces forming the gap, and being stopped by a rib for stopping the molten resin that is provided in the injection channel to stop the flow of the molten resin flowing through the injection channel.

2. A part connecting member made from a synthetic resin, said member to be used to connect at least two kinds of frames including a first frame and a second frame, both being molded pieces that are provisionally connected so as to be adjacently arranged or abutted against each other by a third frame and a fourth frame, both being molded pieces, at side faces of the first and second frames on one end side and the other end side, wherein the provisionally connected frames are set in dies which are different from a die used for formation of each of said molded pieces, wherein said part connecting member comprises a synthetic resin injected as a molten resin into a gap formed between opposed surfaces of the molded pieces that are adjacently arranged or abutted against each other to connect the molded pieces, flowing through an injection channel for the molten resin up to the gap formed in the third frame and the fourth frame, and being stopped by a rib for stopping the molten resin that is provided in the injection channel to stop the flow of the molten resin flowing through the injection channel.

3. A part connecting member according to claim 1 or 2, wherein the injection channel is formed in the one of the molded pieces, and the injection channel connects the gap with an outside of the one of the molded pieces, the outside being situated in a direction that is perpendicular to a flowing direction of the molten resin in the gap and is an assembling direction at a time of provisional connection of the molded pieces.

4. A part connecting member according to claim 3, wherein an inner diameter of an inlet of the injection channel formed in the one of the molded pieces is within a range of 1.5 mm to 3.00 mm, the inlet being situated on an outer side when the part connecting member is formed, and an inner diameter at a portion of the injection channel where the molten resin flows into the gap is within a range of 0.8 mm to 2.5 mm.

5. A part connecting member according to claim 1 or 2, wherein the injection channel formed in the one of the molded pieces has an inlet on a side being an outside when a process cartridge is formed from the molded pieces and has an inner diameter smaller than that of the inlet, the inner diameter being at a portion where the molten resin flows into the gap, and the injection channel is tapered within a range of one degree to six degrees.

6. A part connecting member made from a synthetic resin, said member to be used to connect at least two molded pieces obtained by injection molding of plastic that are provisionally connected by being adjacently arranged or abutted against each other, wherein the provisionally connected molded pieces are set in dies which are different from a die used for formation of each of the molded pieces, wherein said part connecting member comprises a synthetic resin injected as a molten resin into a gap formed between opposed surfaces of the molded pieces that are adjacently arranged or abutted against each other to connect the molded pieces, flowing through an injection channel, and being stopped by a rib for stopping molten resin that is provided in the injection channel to stop the flow of the molten resin flowing through the injection channel, wherein a portion of the opposed surfaces to be connected with the molten resin when the molten resin flows into the gap is not an entire circumference of the gap.

7. A part connecting member made from a synthetic resin, said member to be used to connect at least two kinds of frames including a first frame and a second frame, both being molded pieces, that are provisionally connected so as to be adjacently arranged or abutted against each other by a third frame and a fourth frame, both being molded pieces, at side faces of the first and second frames on one end side and the other en side, wherein the provisionally connected frames are set in dies which are different from die used for formation of each of said molded pieces, wherein said part connecting member comprises a synthetic resin injected as a molten resin into a gap formed between opposed surfaces of the molded pieces that are adjacently arranged or abutted against each other to connect the molded pieces, flowing through an injection channel, and being stopped by a rib for stopping molten resin that is provided in the injection channel to stop the flow of the molten resin flowing through the injection channel, wherein a portion of the opposed surfaces to be connected with the molten resin when the molten resin flows into the gap is not an entire circumference of the gap.

8. A part connecting member according to claim 6 or 7, further comprising a rib disposed in the gap and extending in a direction substantially perpendicular to a resin flowing direction to block a flowing path.

9. A part connecting member according to claim 8, wherein the molten resin is polystyrene without flame-retardant additives.

10. A part connecting member according to any one of claim 1, 2, 6, or 7, wherein the gap for forming a connecting portion is formed at a predetermined position within a projected area of each part forming said part connecting member.

11. A process cartridge detachably mountable to a main body of an image forming apparatus, said process cartridge comprising:

an electrophotographic photosensitive drum;

process means for acting of said electrophotographic photosensitive drum; and a frame made by joining a plurality of molded pieces for supporting said electrophotographic photosensitive drum or said process means, wherein said frame has a construction in that at least two molded pieces obtained by injection molding of plastic are provisionally connected by being adjacently arranged or abutted against each other, the provisionally connected molded pieces are set in dies which are different from a die used for formation of each of the molded pieces, and a molten resin is injected into a gap formed between opposed surfaces of the molded pieces that are adjacently arranged or abutted against each other to connect the molded pieces, and wherein an injection channel for the molten resin up to the gap is formed in one of the molded pieces forming the gap of the opposed surfaces that are adjacently arranged or abutted against each other, and wherein a rib for stopping the molten resin is provided in the injection channel to stop the flow of the molten resin injected into said injection channel.

12. A process cartridge detachably mountable to a main body of an image forming apparatus, said process cartridge comprising:

an electrophotographic photosensitive drum;

process means for acting on said electrophotographic photosensitive drum; and a frame member made by joining a plurality of molded pieces for supporting said electrophotographic photosensitive drum or said process means, wherein said frame member has a construction in that at least two kinds of frames including a first frame and a second frame, both being molded pieces, are provisionally connected so as to be adjacently arranged or abutted against each other by a third frame and a fourth frame, both being molded pieces, at side faces of the first and second frames on one end side and the other end side, the provisionally connected frames are set in dies which are different from a die used for formation of each of the molded pieces, and a molten resin is injected into a gap formed between opposed surfaces of the molded pieces that are adjacently arranged or abutted against each other to connect the molded pieces, wherein an injection channel for the molten resin up to the gap is formed in the third frame and the fourth frame, and wherein a rib for stopping the molten resin is provided in the injection channel to stop the flow of the molten resin injected into the injection channel.

13. A process cartridge according to claim 11 or 12, wherein the injection channel is formed in the one of the molded pieces, and the injection channel connects the gap with an outside of the one of the molded pieces, the outside being situated in a direction that is perpendicular to a flowing direction of the molten resin in the gap and is an assembling direction at a time of provisional connection of the molded pieces.

14. A process cartridge according to claim 13, wherein an inner diameter of an inlet of the injection channel formed in the one of the molded pieces is within a range of 1.5 mm to 3.00 mm, the inlet being situated on an outer side when said process cartridge is formed, and an inner diameter at a portion of the injection channel where the molten resin flows into the gap is within a range of 0.8 m to 2.5 mm.

15. A process cartridge according to claim 11 or 12, wherein the injection channel formed in the one of the molded pieces has an inlet on a side being an outside when the process cartridge is formed from the molded pieces and has an inner diameter smaller than that of the inlet, the inner diameter being at a portion where the molten resin flows into the gap, and the injection channel is tapered within a range of one degree to six degrees.

16. A process cartridge detachably mountable to a main body of an image forming apparatus, said process cartridge comprising:
an electrophotographic photosensitive drum;
process means for acting of said electrophotographic photosensitive drum; and
a frame member made by joining a plurality of molded pieces for supporting said electrophotographic photosensitive drum or said process means,
wherein said frame member has a construction in that at least two molded pieces obtained by injection molding of plastic are provisionally connected by being adjacently arranged or abutted against each other, the provisionally connected molded pieces are set in dies which are different from a die used for formation of each of the molded pieces, and a molten resin is injected into a gap formed between opposed surfaces of the molded pieces that are adjacently arranged or abutted against each other to connect the molded pieces, and wherein a portion of the opposed surfaces to be connected with the molten resin when the molten resin flows into the gap is not an entire circumference of the gap, and
wherein a rib for stopping the molten resin is provided in an injection channel to stop the flow of the molten resin injected into the injection channel through which the molten resin flows.

17. A process cartridge detachably mountable to a main body of an image forming apparatus, said process cartridge comprising:
an electrophotographic photosensitive drum;
process means for acting on said electrophotographic photosensitive drum; and
a frame member made by joining a plurality of molded pieces for supporting said electrophotographic photosensitive drum or said process means,
wherein said frame member has a construction in that at least two kinds of frames including a first frame and a second frame, both being molded pieces, are provisionally connected so as to be adjacently arranged or abutted against each other by a third frame and a fourth frame, both being molded pieces, at side faces of the first and second frames on one end side and the other end side, the provisionally connected frames are set in dies which are different from a die used for formation of each of the molded pieces, and a molten resin is injected into a gap formed between opposed surfaces of the molded pieces that are adjacently arranged or abutted against each other to connect the molded pieces, and wherein a portion of the opposed surfaces to be connected with the molten resin when the molten resin flows into the gap is not an entire circumference of the gap, and
wherein a rib for stopping the molten resin is provided in an injection channel to stop the flow of the molten resin injected into the injection channel through which the molten resin flows.

18. A process cartridge according to claim 16 or 17, further comprising a rib disposed in the gap and extending in a direction substantially perpendicular to a resin flowing direction to block a flowing path.

19. A process cartridge according to claim 18, wherein the molten resin is polystyrene without flame-retardant additives.

20. A process cartridge according to claim 11, 12, 16, or 17, wherein the gap for forming a connecting portion is formed at a predetermined position within an projected area of each part forming said frame member.

21. An electrophotographic image forming apparatus to which a process cartridge is detachably mountable for forming an image on a recording medium, said electrophotographic image forming apparatus comprising:
(a) mounting means for mounting the process cartridge, the process cartridge comprising:
an electrophotographic photosensitive drum;
process means for acting on the electrophotographic photosensitive drum; and
a frame made by joining a plurality of molded pieces for supporting the electrophotographic photosensitive drum or the process means,
wherein the frame has a construction in that at least two molded pieces obtained by injection molding of plastic are provisionally connected by being adjacently arranged or abutted against each other, the provisionally connected molded pieces are set in dies which are different from a die used for formation of each of the molded pieces, and a molten resin is injected into a gap formed between opposed surfaces of the molded pieces that are adjacently arranged or abutted against each other to connect the molded pieces, and wherein an injection channel for the molten resin up to the gap is formed in one of the molded pieces forming the gap of the opposed surfaces that are adjacently arranged or abutted against each other, and
wherein a rib for stopping the molten resin is provided in the injection channel to stop the flow of the molten resin injected into the injection channel; and
(b) transporting means for transporting the recording medium.

22. An electrophotographic image forming apparatus to which a process cartridge is detachably mountable for forming an image on a recording medium, said electrophotographic image forming apparatus comprising:
(a) mounting means for mounting the process cartridge, the process cartridge comprising:
an electrophotographic photosensitive drum;

process means for acting on said electrophotographic photosensitive drum; and a frame member made by joining a plurality of molded pieces for supporting said electrophotographic photosensitive drum or said process means, wherein said frame member has a construction in that at least two kinds of frames including a first frame and a second frame, both being molded pieces, are provisionally connected so as to be adjacently arranged or abutted against each other by a third frame and a fourth frame, both being molded pieces, at side faces of the first and second frames on one end side and the other end side, the provisionally connected frames are set in dies which are different from a die used for formation of each of the molded pieces, and a molten resin is injected into a gap formed between opposed surfaces of the molded pieces that are adjacently arranged or abutted against each other to connect the molded pieces, and wherein an injection channel for the molten resin up to the gap is formed in the third frame and the fourth frame, and wherein a rib for stopping the molten resin is provided in the injection channel to stop the flow of the molten resin injected into the injection channel; and (b) transporting means for transporting the recording medium.

23. An electrophotographic image forming apparatus according to claim 21 or 22, wherein the injection channel is formed in the one of the molded pieces, and the injection channel connects the gap with an outside of the one of the molded pieces, the outside being situated in a direction that is perpendicular to a flowing direction of the molten resin in the gap and is an assembling direction at a time of provisional connection of the molded pieces.

24. An electrophotographic image forming apparatus according to claim 23, wherein an inner diameter of an inlet of the injection channel formed in the one of the molded pieces is within a range of 1.5 mm to 3.00 mm, the inlet being situate on an outer side when the process cartridge is formed, an inner diameter at a portion of the injection channel where the molten resin flows into the gap is within a range of 0.8 mm to 2.5 mm.

25. An electrophotographic image forming apparatus according to claim 21 or 22, wherein the injection channel formed in the one of the molded pieces has an inlet on a side being an outside when the process cartridge is formed and has an inner diameter smaller than that of the inlet, the inner diameter being at a portion where the molten resin flows into the gap, and the injection channel is tapered within a range of one degree to six degrees.

26. An electrophotographic image forming apparatus to which a process cartridge is detachably mountable for forming an image on a recording medium, said electrophotographic image forming apparatus comprising:

(a) mounting means for mounting the process cartridge, the process cartridge comprising:
an electrophotographic photosensitive drum;
process means for acting on said electrophotographic photosensitive drum; and
a frame member made by joining a plurality of molded pieces for supporting said electrophotographic photosensitive drum or said process means, wherein said frame member has a construction in that at least two molded pieces obtained by injection molding of plastic are provisionally connected by being adjacently arranged or abutted against each other, the provisionally connected molded pieces are set in dies which are different from a die used for formation of each of the molded pieces, and a molten resin is injected into a gap formed between opposed surfaces of the molded pieces that are adjacently arranged or abutted against each other to connect the molded pieces, and wherein a portion of the opposed surfaces to be connected with the molten resin when the molten resin flows into the gap is not an entire circumference of the gap, and wherein a rib for stopping the molten resin is provided in an injection channel to stop the flow of the molten resin injected into the injection channel through which the molten resin flows; and (b) transporting means for transporting the recording medium.

27. An electrophotographic image forming apparatus to which a process cartridge is detachably mountable for forming an image on a recording medium, said electrophotographic image forming apparatus comprising:

(a) mounting means for mounting the process cartridge, the process cartridge comprising:
an electrophotographic photosensitive drum;
process means for acting on said electrophotographic photosensitive drum; and
a frame member made by joining a plurality of molded pieces for supporting said electrophotographic photosensitive drum or said process means, wherein said frame member has a construction in that at least two kinds of frames including a first frame and a second frame, both being molded pieces, are provisionally connected so as to be adjacently arranged or abutted against each other by a third frame and a fourth frame, both being molded pieces, at side faces of the first and second frames on one end side and the other end side, the provisionally connected frames are set in dies which are different from a die used for formation of each of the molded pieces, and a molten resin is injected into a gap formed between opposed surfaces of the molded pieces that are adjacently arranged or abutted against each other to connect the molded pieces, and wherein a portion of the opposed surfaces to be connected with the molten resin when the molten resin flows into the gap is not an entire circumference of the gap, and wherein a rib for stopping the molten resin is provided in an injection channel to stop the flow of the molten resin injected into the injection channel through which the molten resin flows; and (b) transporting means for transporting the recording medium.

28. An electrophotographic image forming apparatus according to claim 26 or 27, further comprising a rib disposed in the gap and extending in a direction substantially perpendicular to a resin flowing direction to block a flowing path.

29. An electrophotographic image forming apparatus according to claim 28, wherein the molten resin is polystyrene without flame-retardant additives.

30. An electrophotographic image forming apparatus according to claim 22, 26, or 27, wherein the gap for forming a connecting portion is formed at a predetermined position within an projected area of each part forming said frame member.

31. An electrophotographic image forming apparatus according to claim 21, wherein the gap for forming a connecting portion is formed at a predetermined position within an projected area of each part forming said frame.

* * * * *

UNITED STATES PATENT AND TRADEMARK OFFICE
CERTIFICATE OF CORRECTION

PATENT NO. : 6,654,578 B2
DATED : November 25, 2003
INVENTOR(S) : Akira Suzuki et al.

It is certified that error appears in the above-identified patent and that said Letters Patent is hereby corrected as shown below:

Column 1,
Line 42, "as" should be deleted.

Column 6,
Line 21, "vies" should read -- views --.
Line 52, "as" should read -- as to --.

Column 10,
Line 17, "Consequently" should read -- Consequently, --.
Line 56, "cuffing" should read -- cutting --.

Column 15,
Line 16, "an" should read -- and --.

Column 19,
Line 25, "flows" should read -- flowing --.
Line 60, "en" should read -- end --.
Line 61, "die" should read -- a die --.

Column 20,
Line 23, "of" should read -- on --.

Column 22,
Line 28, "an" should read -- a --.

Column 23,
Line 38, "situate" should read -- situated --.
Line 39, "an" should read -- and an --.
Line 40, "flows" should read -- flowing --.

UNITED STATES PATENT AND TRADEMARK OFFICE
CERTIFICATE OF CORRECTION

PATENT NO.   : 6,654,578 B2
DATED        : November 25, 2003
INVENTOR(S)  : Akira Suzuki et al.

It is certified that error appears in the above-identified patent and that said Letters Patent is hereby corrected as shown below:

Column 24,
Line 65, "an" should read -- a --.

Signed and Sealed this

Twenty-second Day of June, 2004

JON W. DUDAS
*Acting Director of the United States Patent and Trademark Office*